(12) United States Patent
Rathour et al.

(10) Patent No.: US 11,463,577 B2
(45) Date of Patent: Oct. 4, 2022

(54) METHOD AND APPARATUS FOR PROVIDING COMMUNICATION AVAILABILITY OF USERS

(71) Applicant: Samsung Electronics Co., Ltd., Suwon-si (KR)

(72) Inventors: Sunil Rathour, Noida (IN); Nitesh Goyal, Ghaziabad (IN); Pratush Kumar Srivastava, Lucknow (IN); Ankit Agarwal, Ghaziabad (IN); Ekta Anil Pardeep Sachdev, Mumbai (IN); Ridhima Jaiswal, Ghaziabad (IN); Reetika Mittal, Hardoi (IN); Vobbilisetty Sushant, Cuttack (IN); Desh Deepak Agarwal, Faridabad (IN); Anuj Mahajan, Ghaziabad (IN); Aasheesh Nain, Padampur (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/768,762

(22) PCT Filed: Dec. 4, 2018

(86) PCT No.: PCT/KR2018/015257
§ 371 (c)(1),
(2) Date: Jun. 1, 2020

(87) PCT Pub. No.: WO2019/112297
PCT Pub. Date: Jun. 13, 2019

(65) Prior Publication Data
US 2020/0322475 A1    Oct. 8, 2020

(30) Foreign Application Priority Data

Dec. 5, 2017 (IN) .............................. 201741043632

(51) Int. Cl.
*H04M 1/72454* (2021.01)
*G06Q 10/10* (2012.01)
*H04L 67/54* (2022.01)

(52) U.S. Cl.
CPC ...... *H04M 1/72454* (2021.01); *G06Q 10/109* (2013.01); *H04L 67/54* (2022.05); *H04M 2250/60* (2013.01)

(58) Field of Classification Search
CPC ......... H04M 1/72454; H04M 2250/60; H04M 1/724; G06Q 10/109; H04L 67/24
See application file for complete search history.

(56) References Cited

U.S. PATENT DOCUMENTS

| 8,694,517 B2 | 4/2014 | Johnsen et al. |
| 2004/0073643 A1 | 4/2004 | Hayes et al. |
| (Continued) | | |

FOREIGN PATENT DOCUMENTS

| EP | 2 150 033 A1 | 2/2010 |
| KR | 10-2006-0000833 A | 1/2006 |
| (Continued) | | |

OTHER PUBLICATIONS

Indian Office Action dated Jul. 15, 2020, issued in Indian Application No. 201741043632.

*Primary Examiner* — Michael A Keller
(74) *Attorney, Agent, or Firm* — Jefferson IP Law, LLP

(57) ABSTRACT

According to an embodiment, there is provided an electronic device comprising: a memory storing instructions; and at least one processor configured to execute the instructions to: generate state information regarding a device state of the electronic device of a first user and communication information regarding communications of the first user with a second user; transmitting the state information and the communication information to a server or an electronic device of the second user, wherein the state information and (Continued)

the communication information are used to determine communication availability of the first user and to provide the second user with information regarding the communication availability of the first user.

18 Claims, 24 Drawing Sheets

(56) References Cited

U.S. PATENT DOCUMENTS

| | | |
|---|---|---|
| 2005/0141686 A1 | 6/2005 | Matsunaga et al. |
| 2009/0077026 A1* | 3/2009 | Yanagihara .......... G06Q 10/107 |
| 2010/0029260 A1 | 2/2010 | Kim et al. |
| 2010/0217809 A1* | 8/2010 | Vymenets ......... H04M 1/72436 |
| | | 709/206 |
| 2011/0158398 A1* | 6/2011 | Kannan ............... H04M 3/5191 |
| | | 379/265.09 |
| 2013/0217364 A1 | 8/2013 | Varoglu et al. |
| 2020/0213209 A1* | 7/2020 | Turow .................. H04L 43/045 |

FOREIGN PATENT DOCUMENTS

| | | |
|---|---|---|
| KR | 10-2009-0068819 A | 6/2009 |
| KR | 10-1058660 B1 | 8/2011 |
| KR | 10-2015-0017615 A | 2/2015 |
| WO | 2015/103067 A1 | 7/2015 |

* cited by examiner

[Fig. 1]
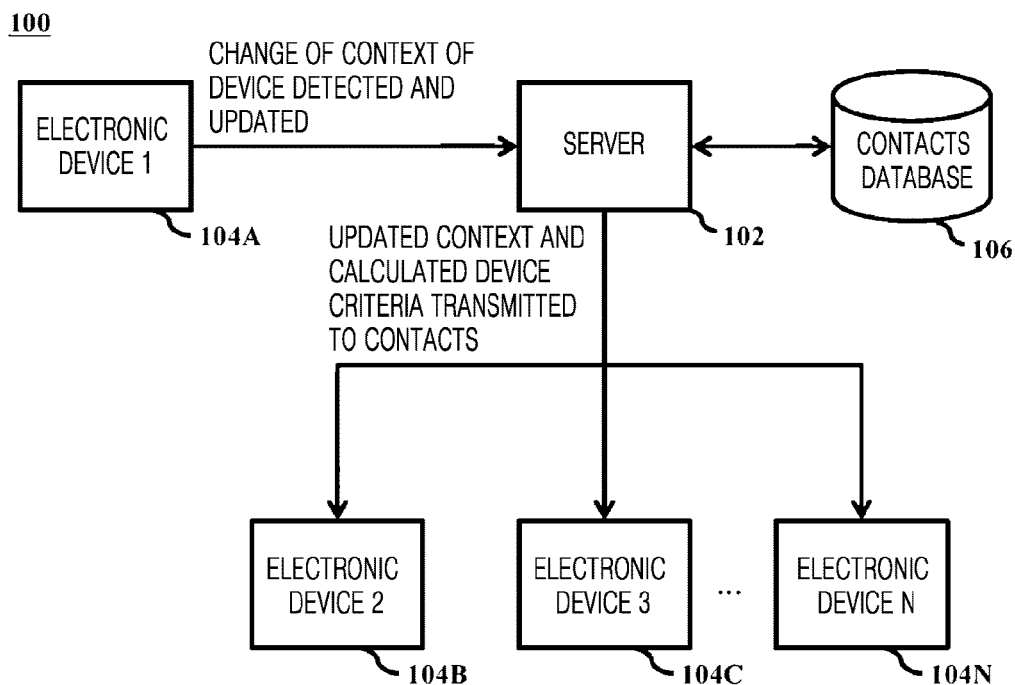
[Fig. 2]
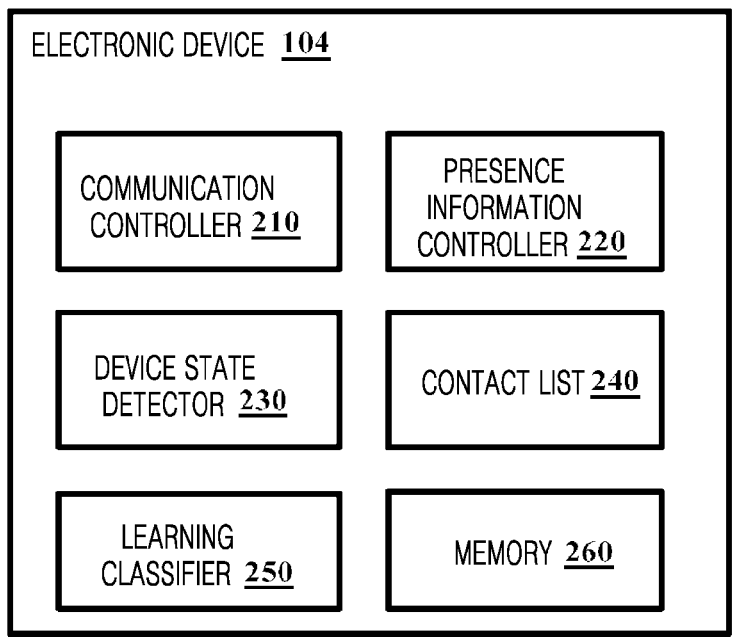

[Fig. 3]
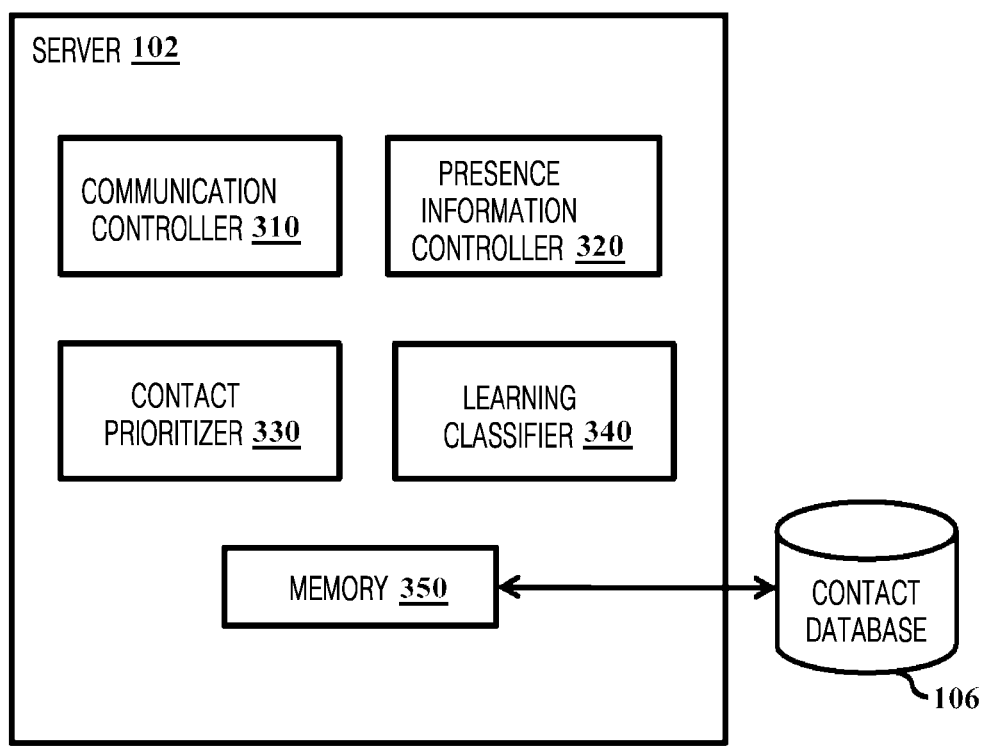

[Fig. 4A]
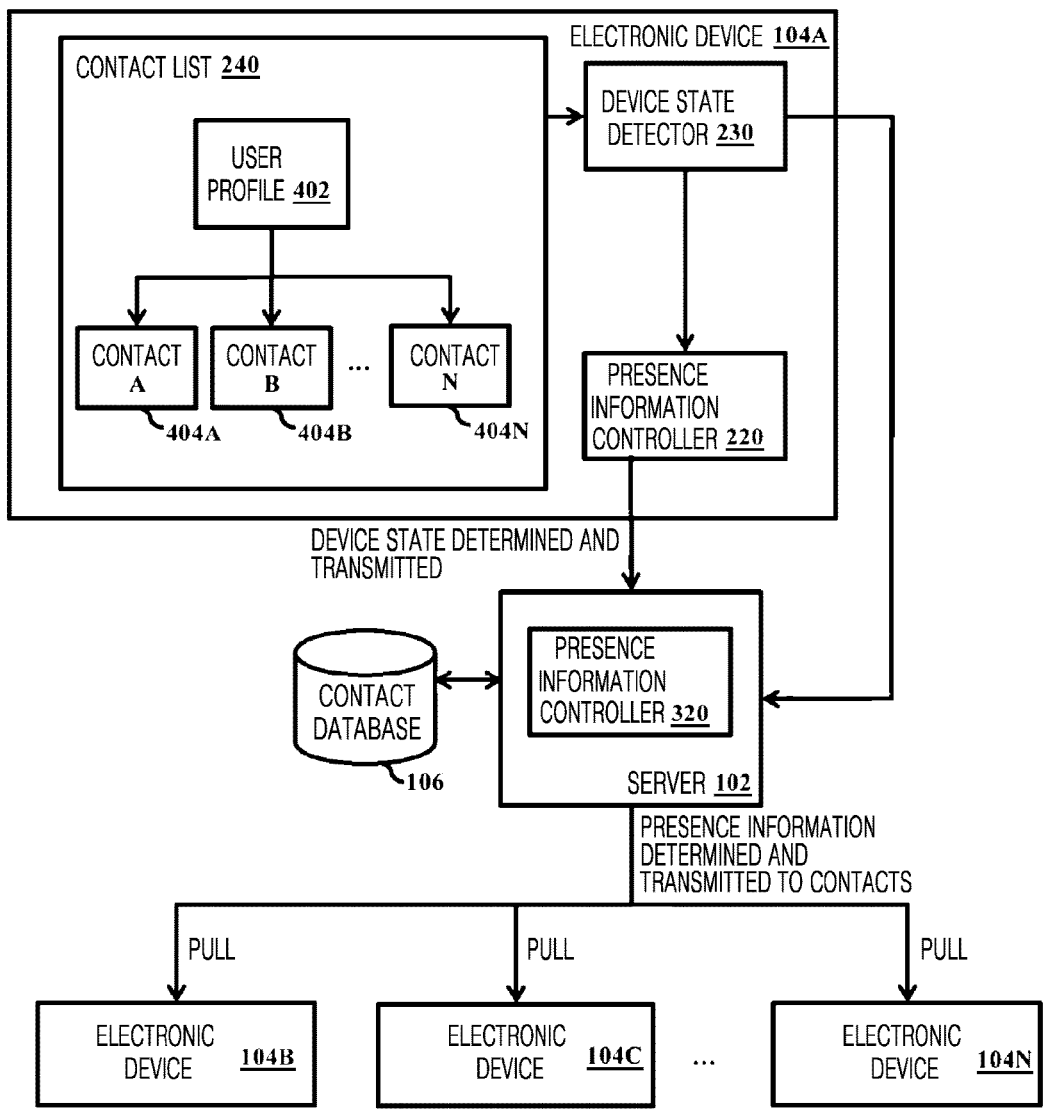

[Fig. 4B]
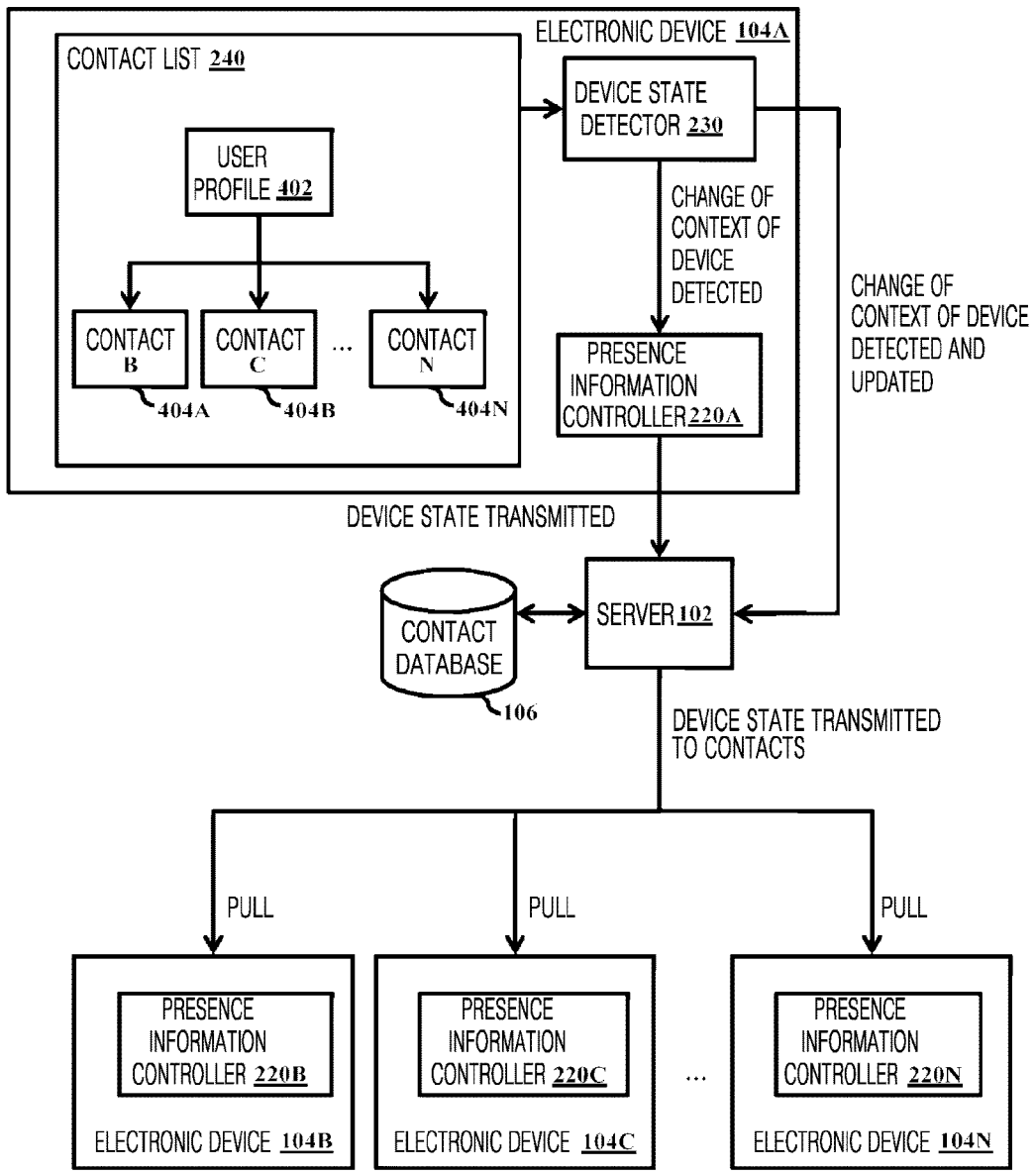

```
┌─────────────────────────────────────────────────────────────┐
│ RECEIVING A DEVICE STATE OF A FIRST USER AND A DEGREE OF    │──502
│ COMMUNICATION OF THE FIRST USER WITH A SECOND USER          │
└─────────────────────────────────────────────────────────────┘
                              ↓
┌─────────────────────────────────────────────────────────────┐
│ DETERMINE A PRESENCE INFORMATION OF THE FIRST USER BASED ON │
│ THE DEVICE STATE OF THE FIRST USER AND THE DEGREE OF        │──504
│ COMMUNICATION OF THE FIRST USER WITH THE SECOND USER        │
└─────────────────────────────────────────────────────────────┘
                              ↓
┌─────────────────────────────────────────────────────────────┐
│ STORE THE PRESENCE INFORMATION FOR THE FIRST USER IN THE    │──506
│ CONTACT LIST OF THE SECOND USER                             │
└─────────────────────────────────────────────────────────────┘
                              ↓
┌─────────────────────────────────────────────────────────────┐
│ AUTOMATICALLY PRIORITIZE A PREFERRED MODE OF COMMUNICATION  │──508
│ OF THE FIRST USER BASED ON THE PRESENCE INFORMATION OF THE FIRST USER │
└─────────────────────────────────────────────────────────────┘
                              ↓
┌─────────────────────────────────────────────────────────────┐
│ DISPLAY THE PREFERRED MODE OF COMMUNICATION OF THE FIRST    │──510
│ USER BASED ON THE PRIORITIZING IN THE CONTACT LIST OF THE SECOND USER │
└─────────────────────────────────────────────────────────────┘
```

[Fig. 6]
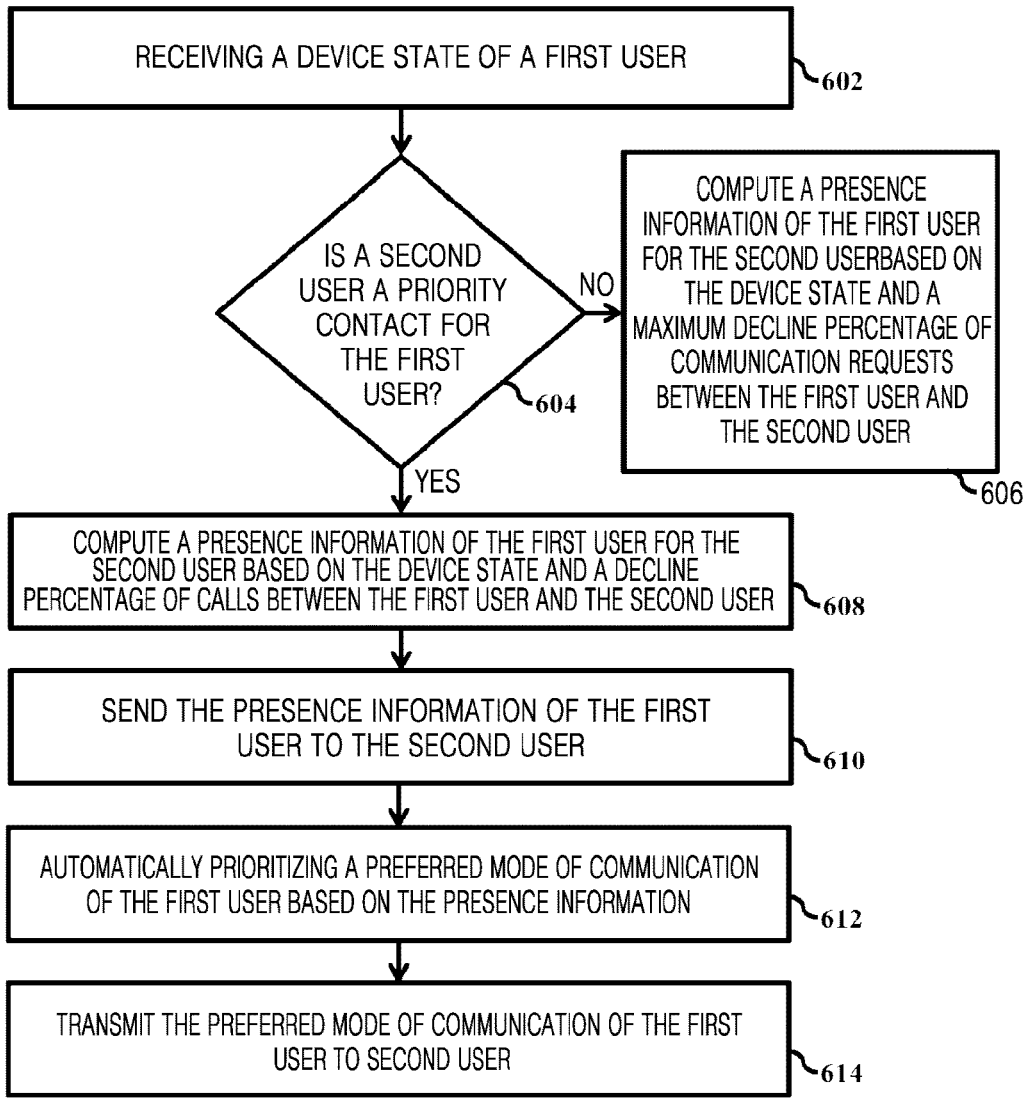
[Fig. 7]
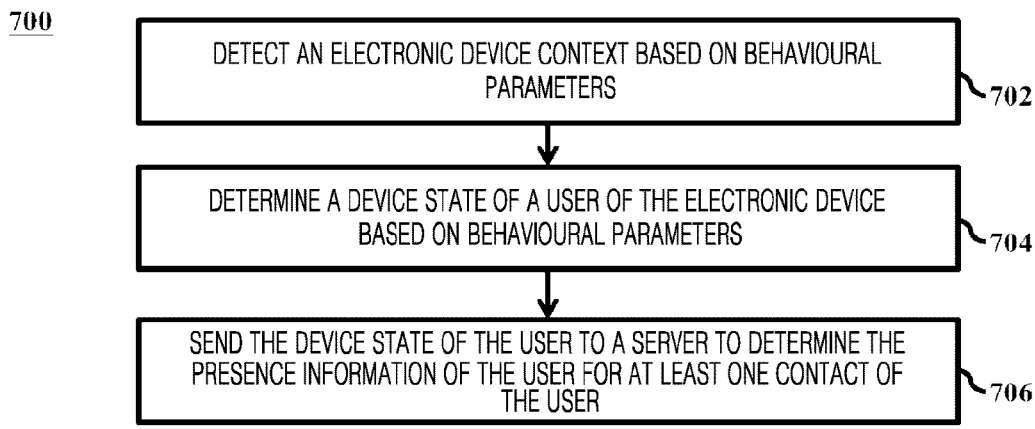

[Fig. 8A]
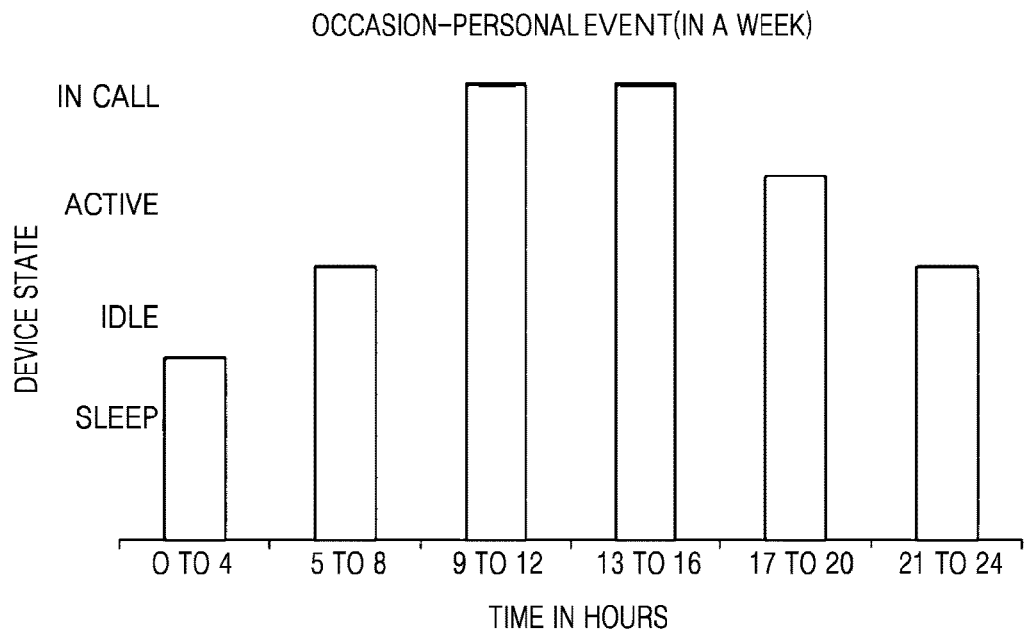
[Fig. 8B]
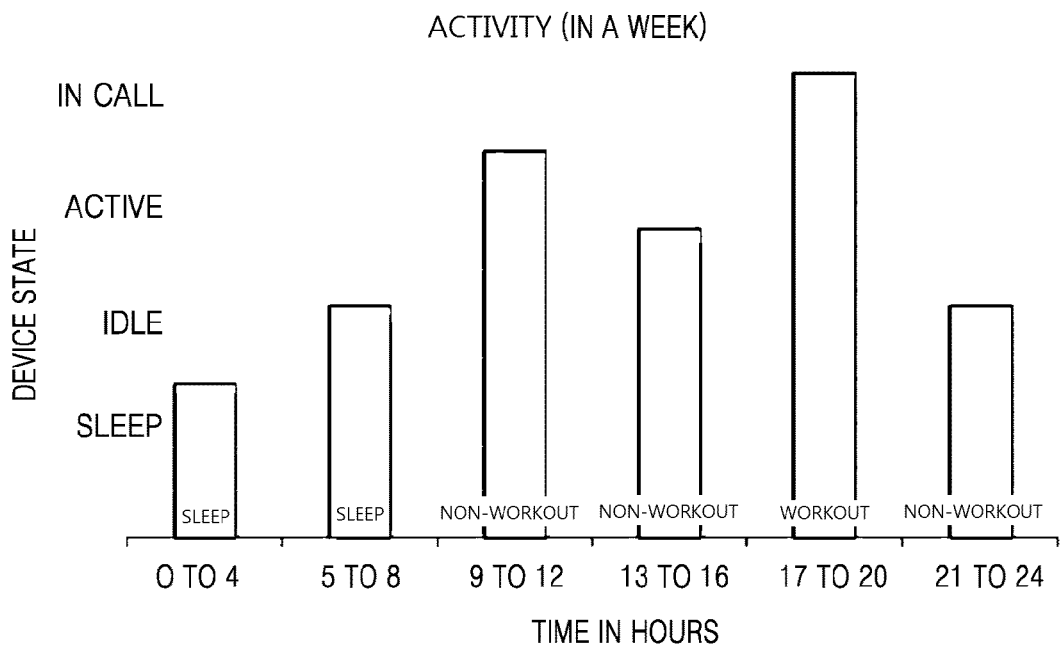

[Fig. 8C]
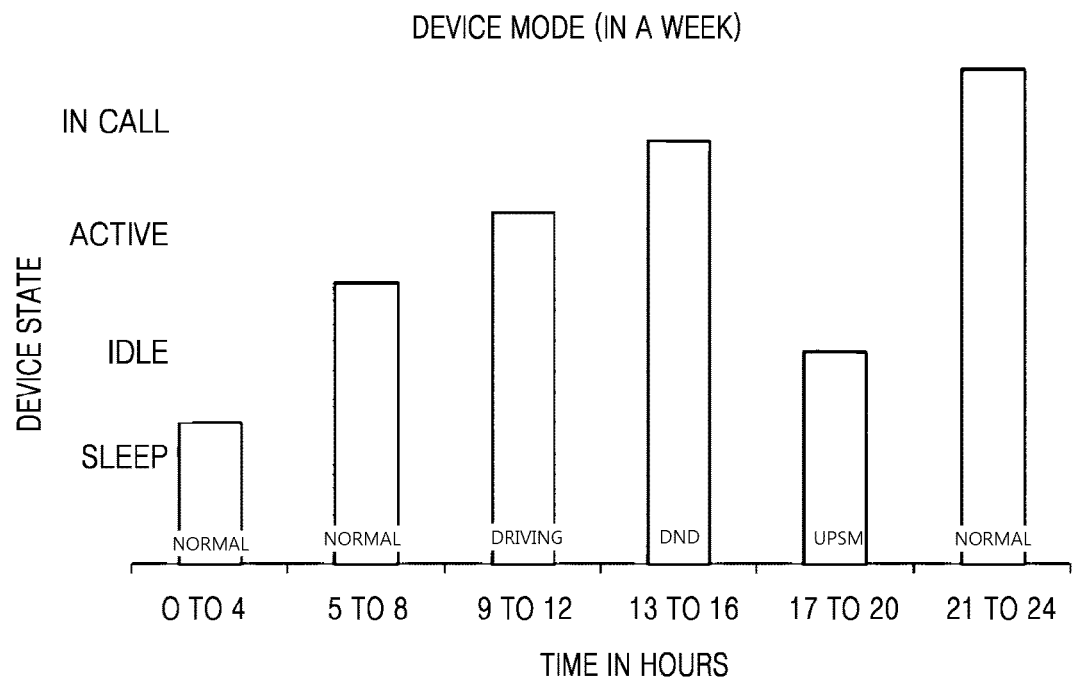
[Fig. 8D]
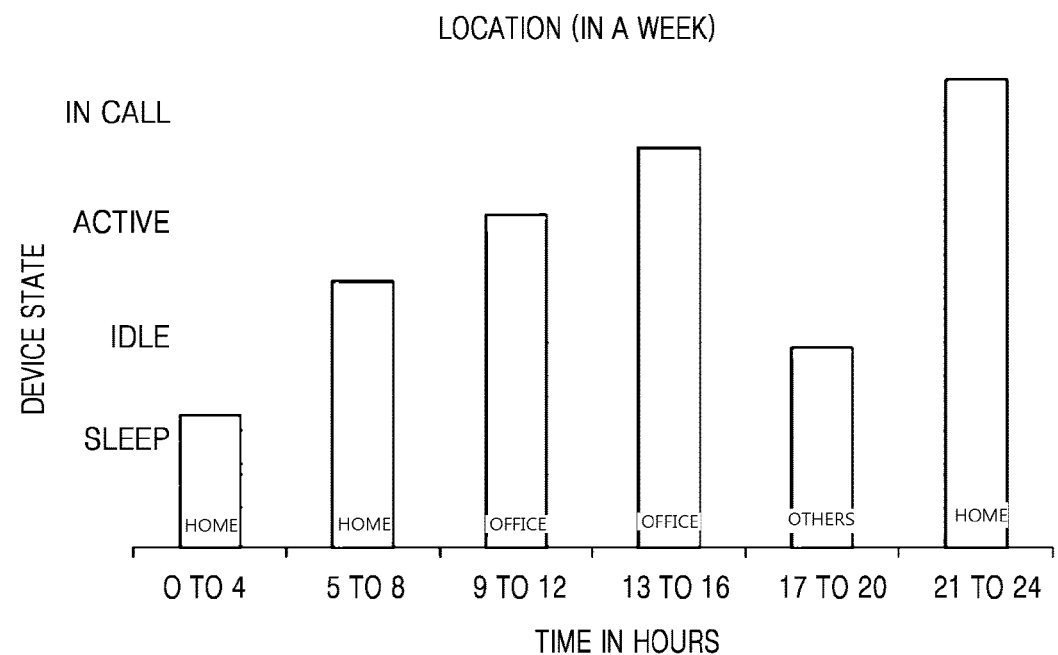

[Fig. 9A]
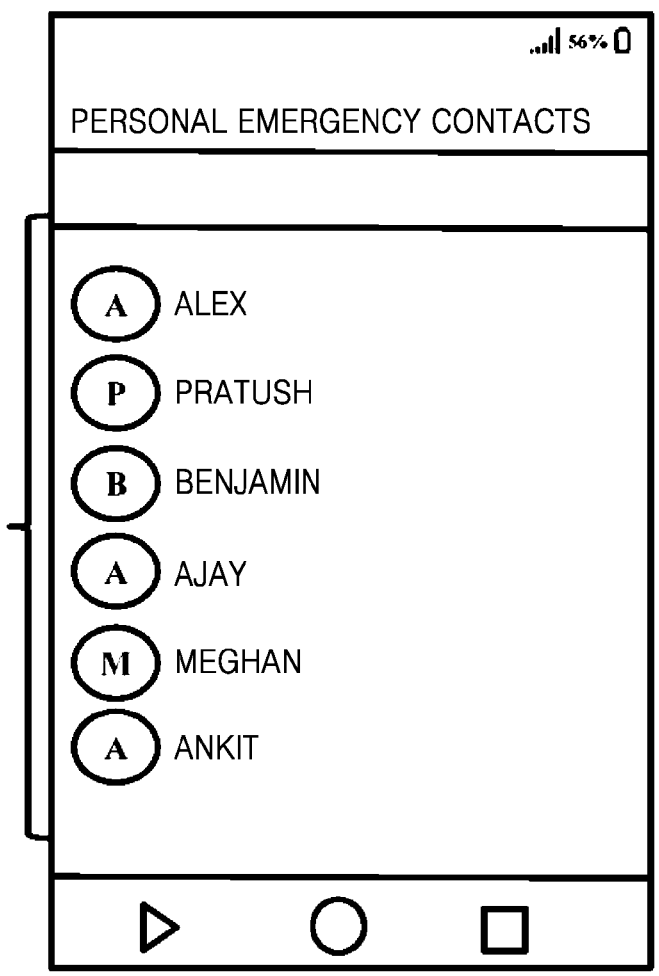
LIST OF EMERGENCY CONTACTS ARE NOT SORTED BASED ON AVAILABILITY

[Fig. 9B]
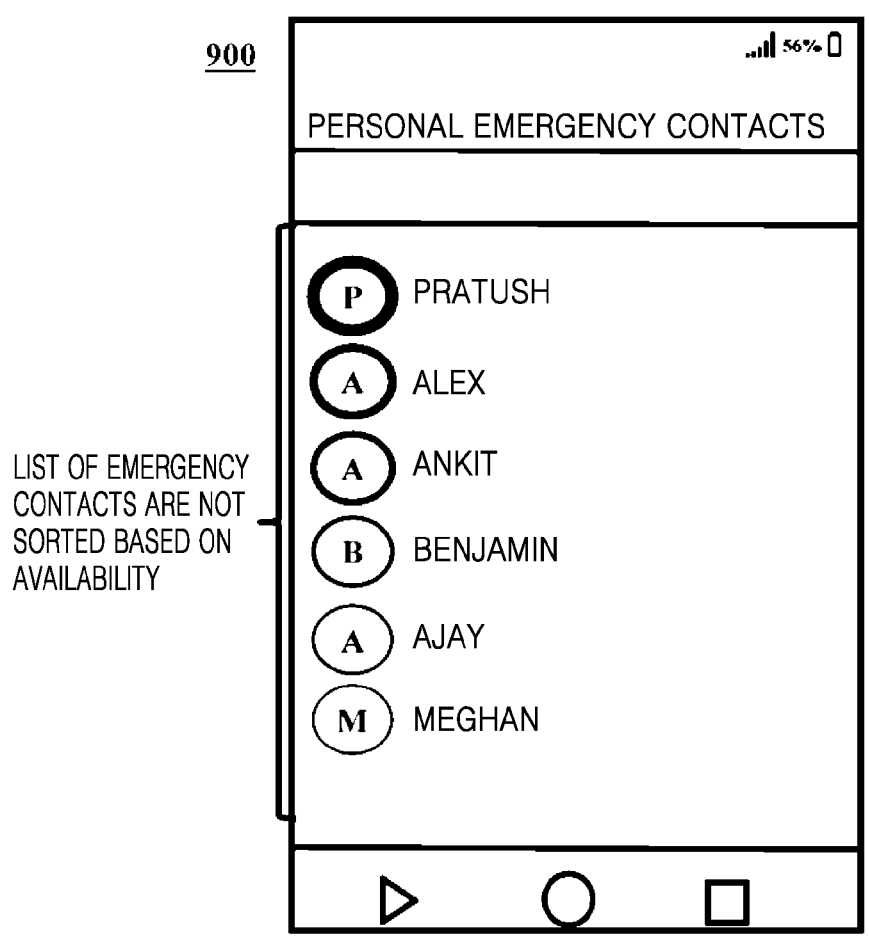

[Fig. 10A]
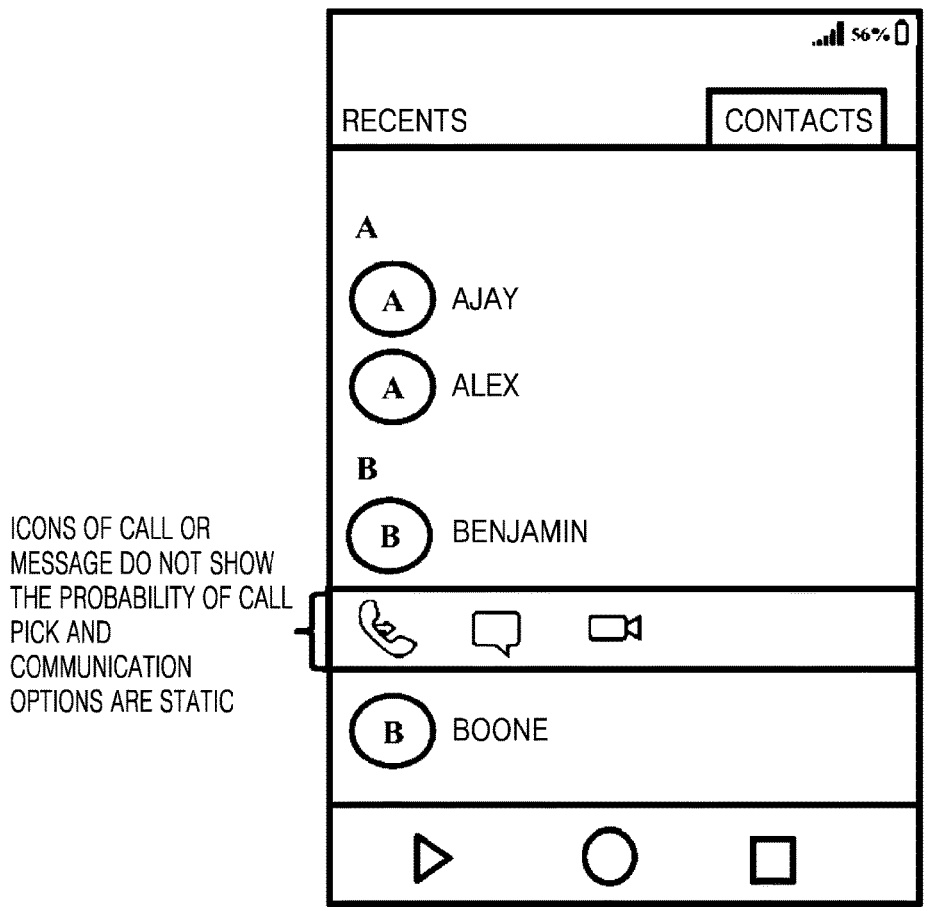
ICONS OF CALL OR MESSAGE DO NOT SHOW THE PROBABILITY OF CALL PICK AND COMMUNICATION OPTIONS ARE STATIC
[Fig. 10B]
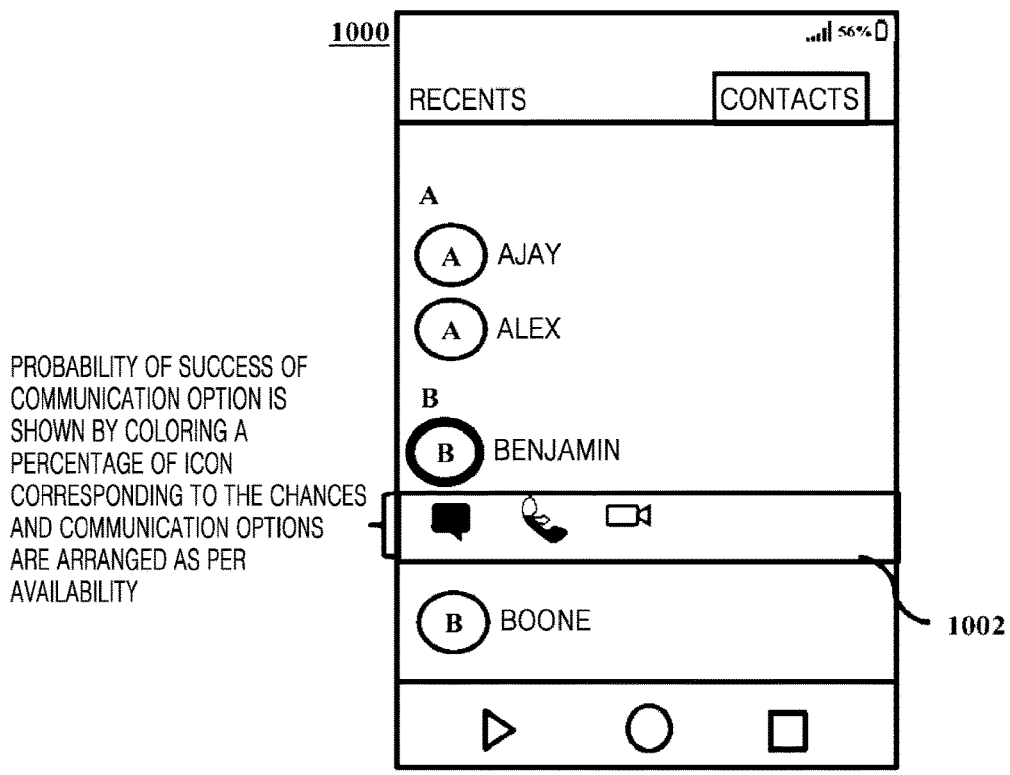
PROBABILITY OF SUCCESS OF COMMUNICATION OPTION IS SHOWN BY COLORING A PERCENTAGE OF ICON CORRESPONDING TO THE CHANCES AND COMMUNICATION OPTIONS ARE ARRANGED AS PER AVAILABILITY

[Fig. 11A]
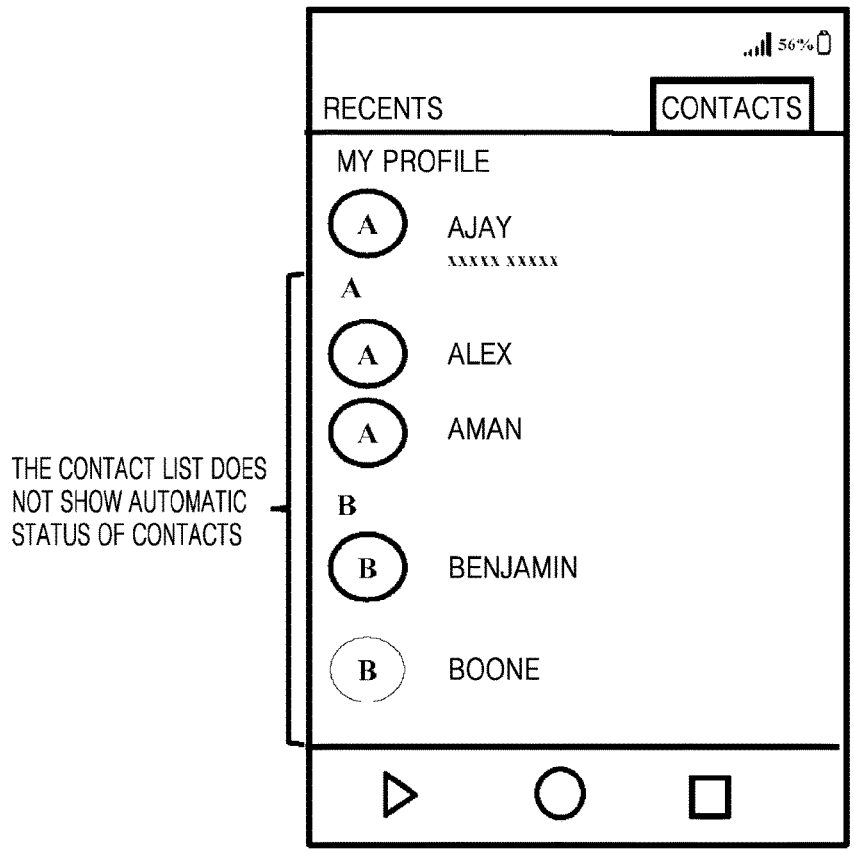
[Fig. 11B]
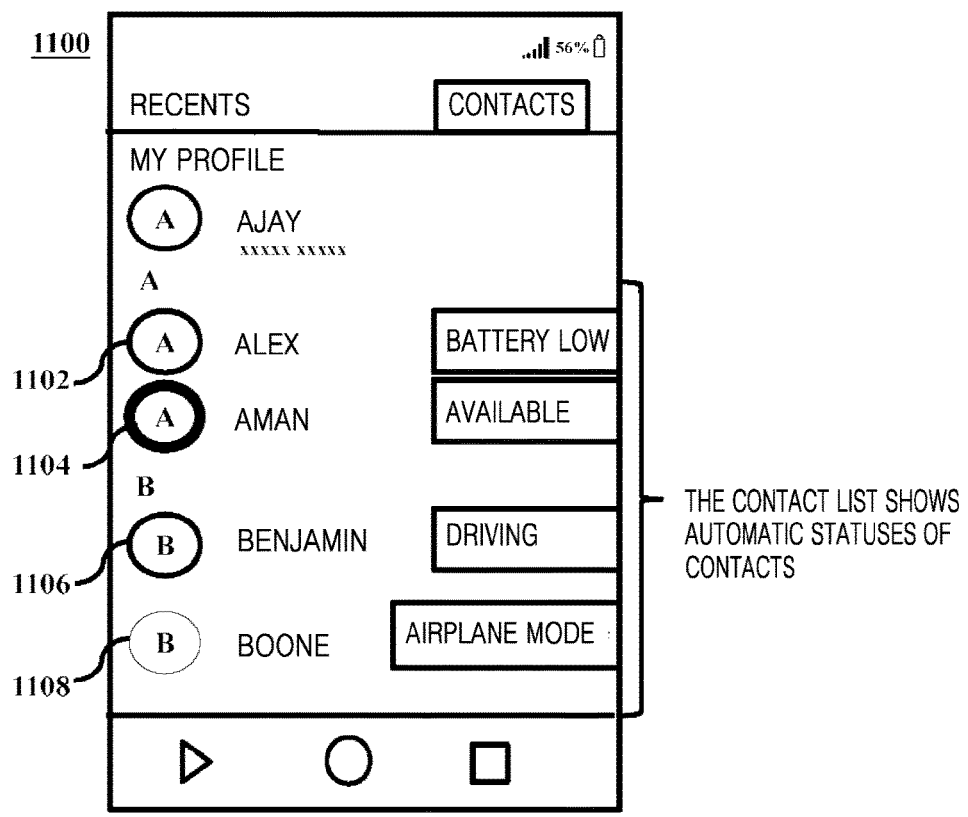

[Fig. 12A]
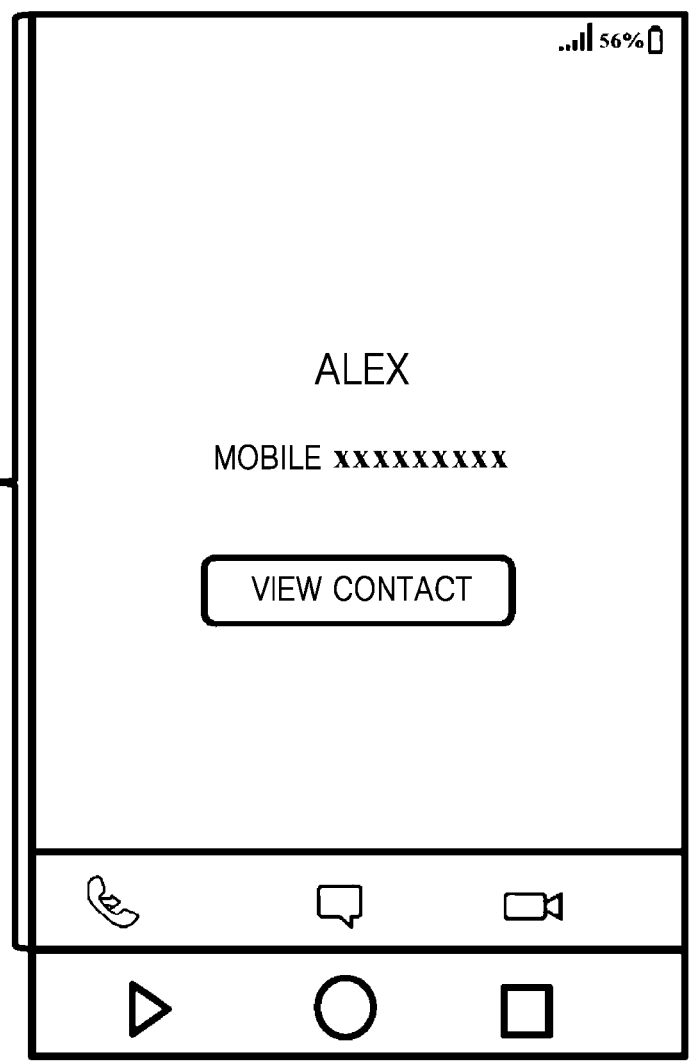
IF A CALL IS NOT ATTENDED, NO REMINDER IS PROVIDED

[Fig. 12B]
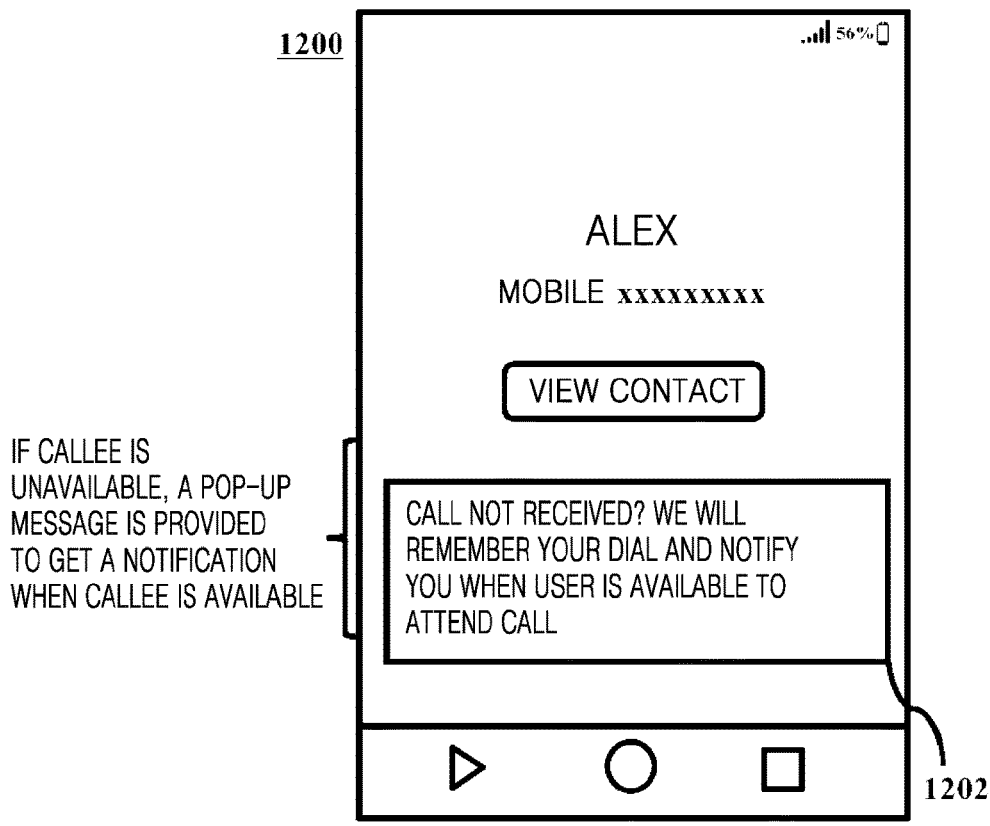
[Fig. 12C]
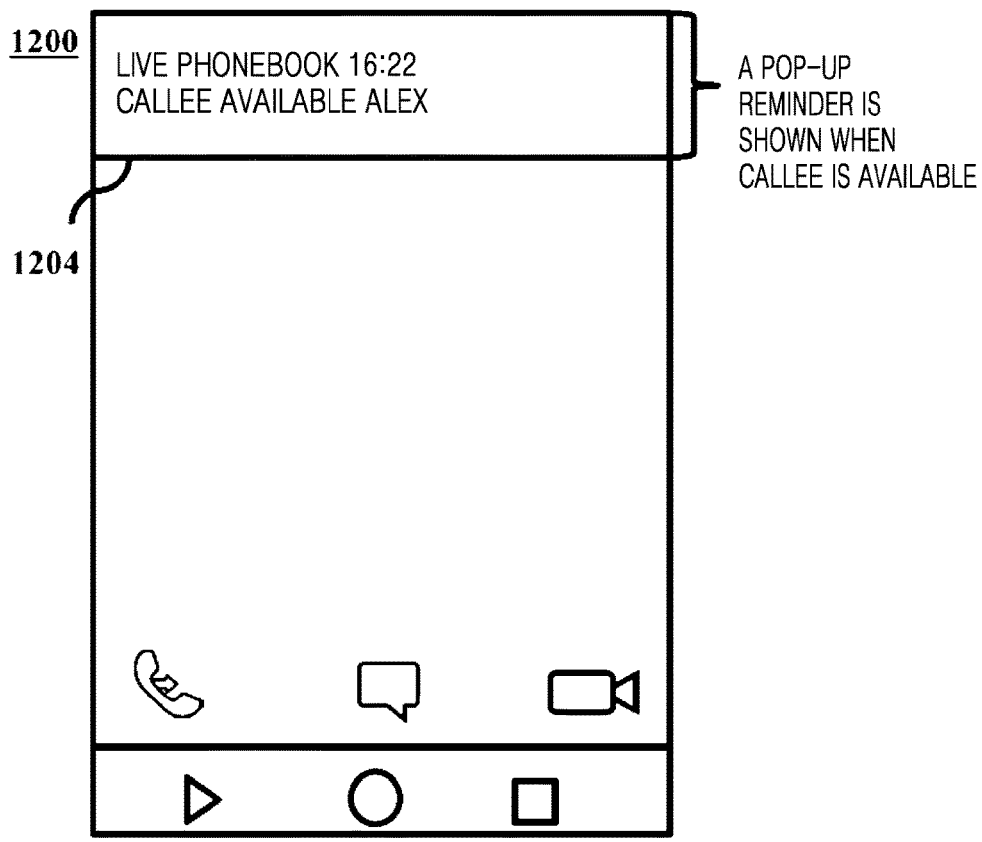

[Fig. 13A]
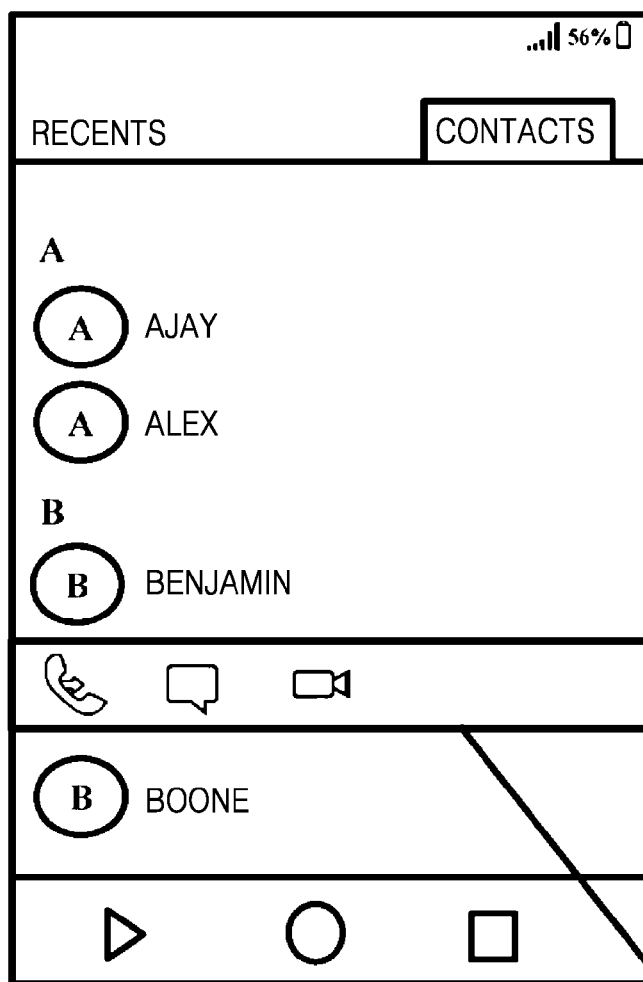
THE TIME AT WHICH A CALLEE MAY BE AVAILABLE IS UNKNOWN

[Fig. 13B]
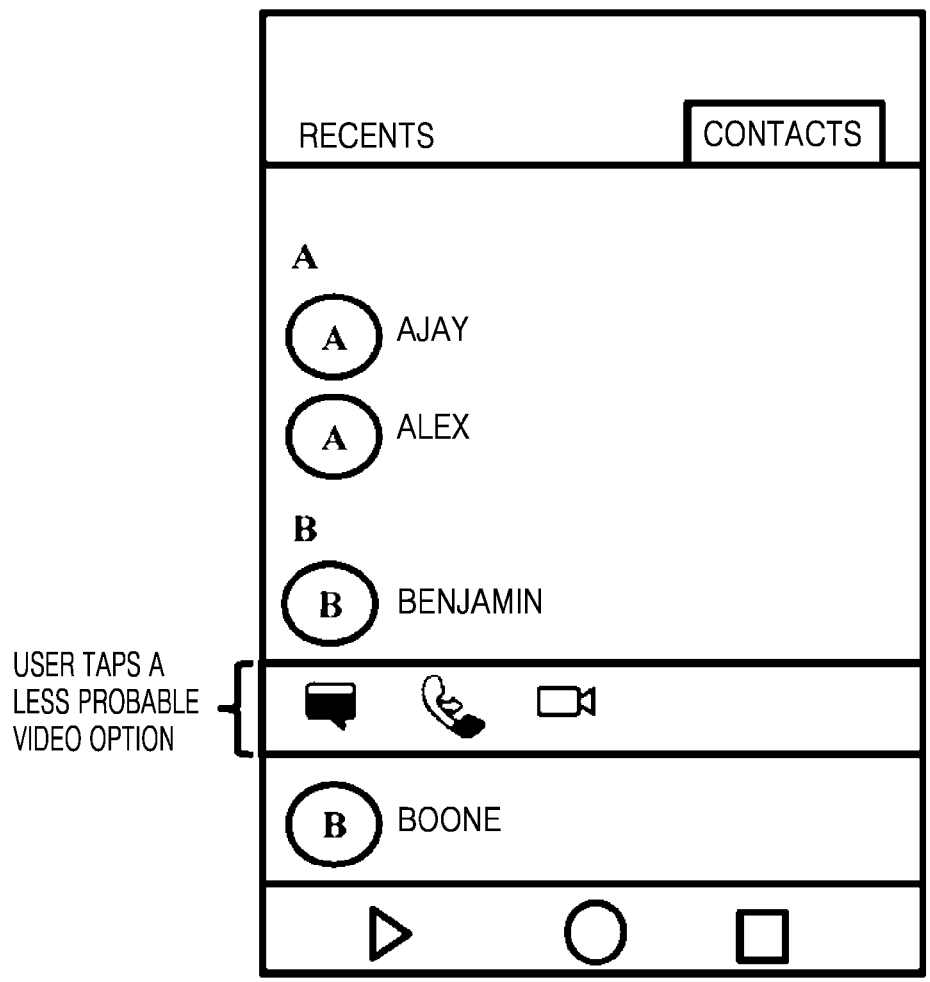

[Fig. 13C]
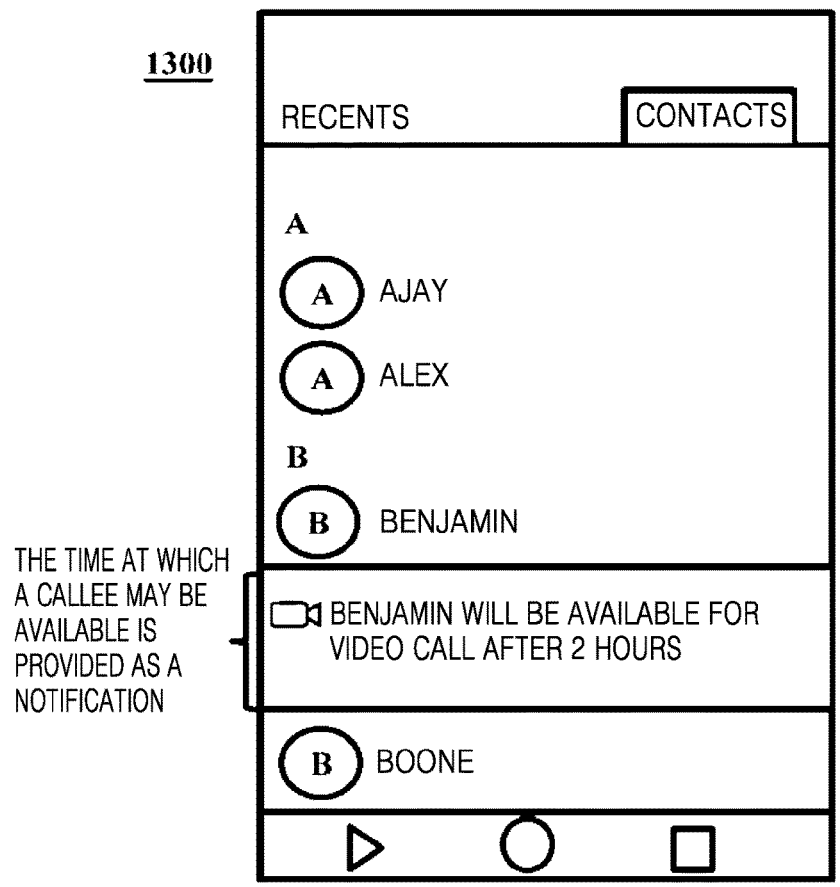
[Fig. 14A]
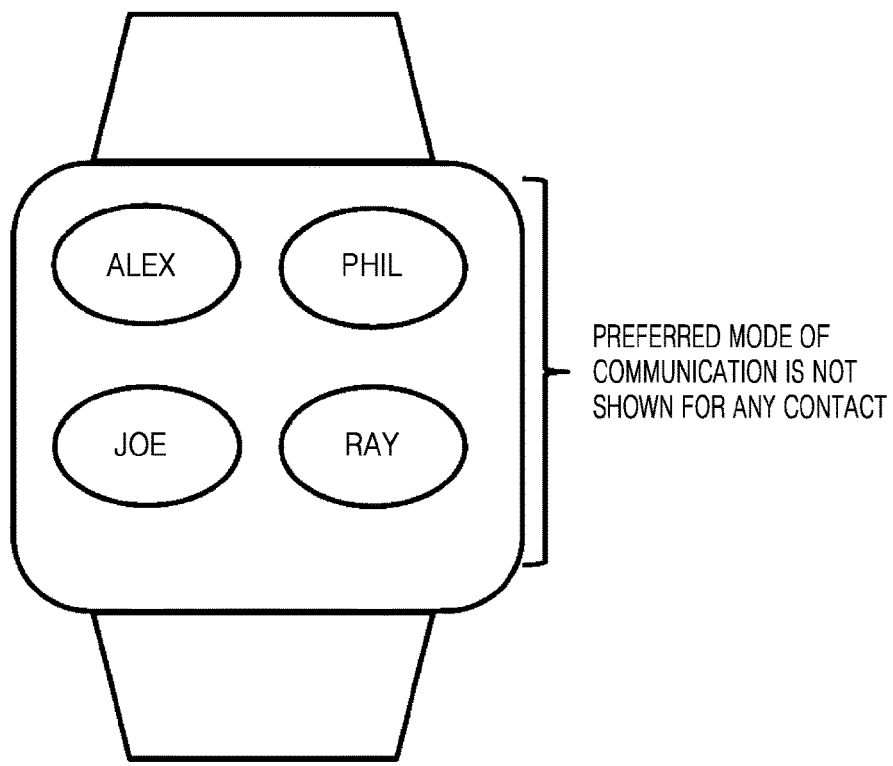

[Fig. 14B]
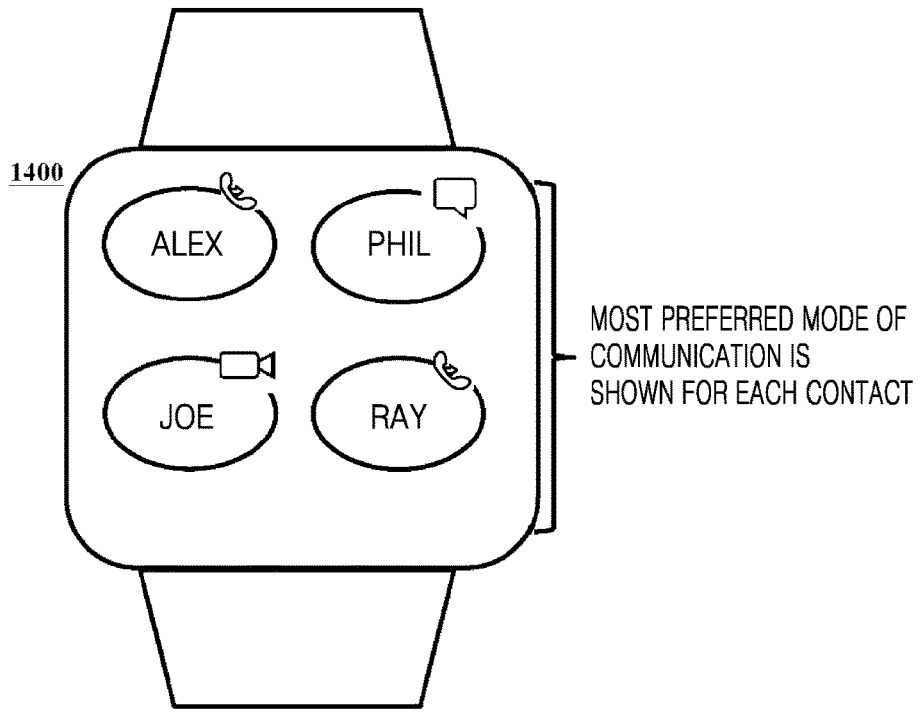
[Fig. 15A]
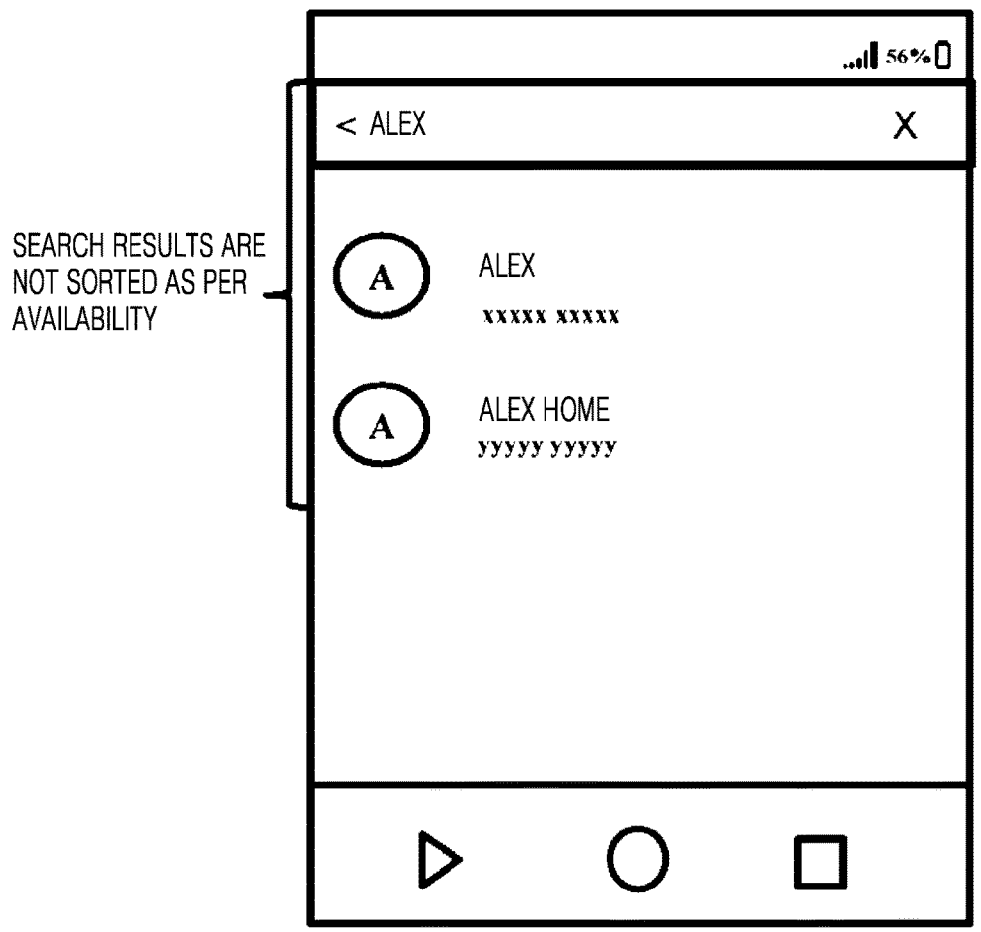

[Fig. 15B]
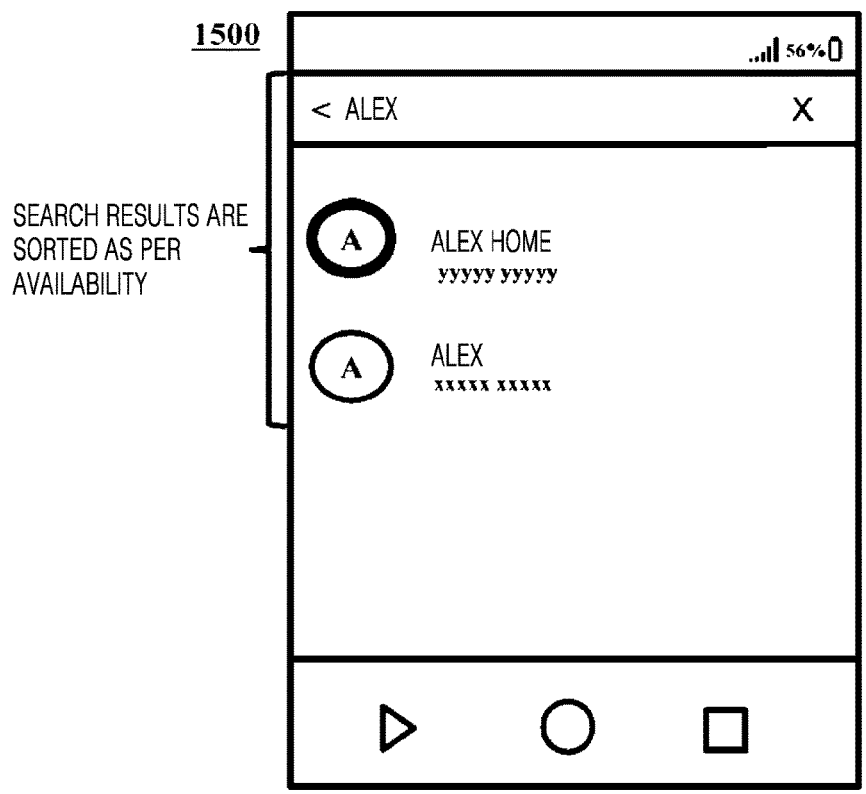
[Fig. 16A]
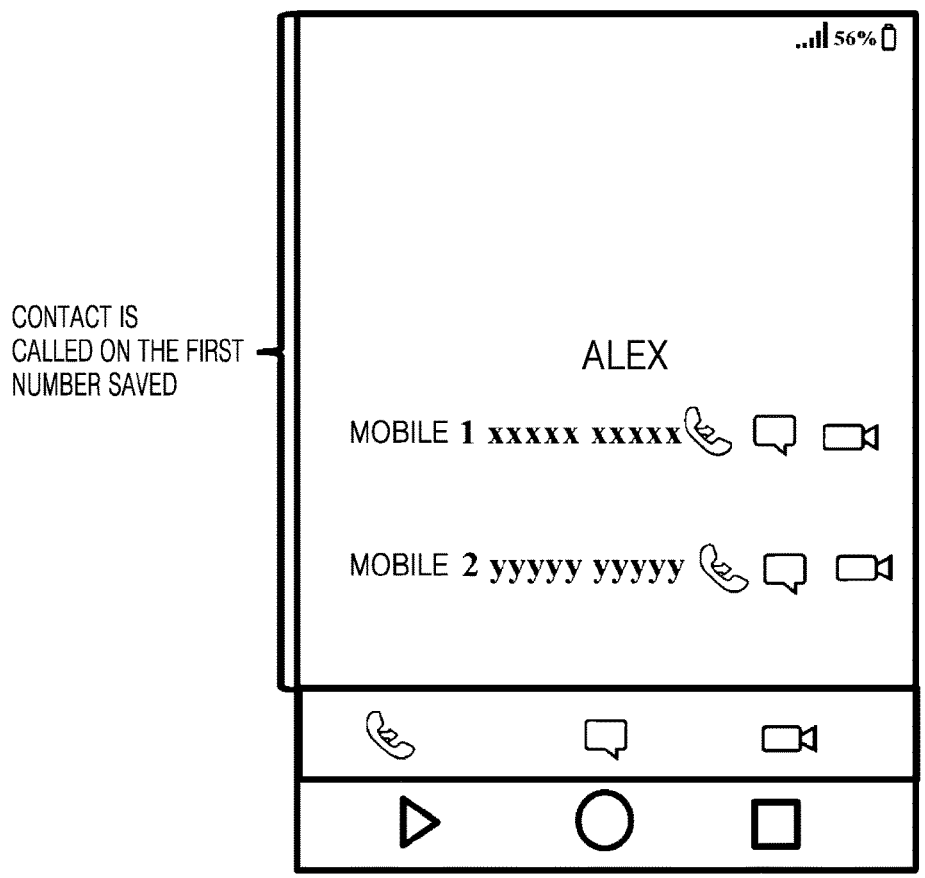

[Fig. 16B]
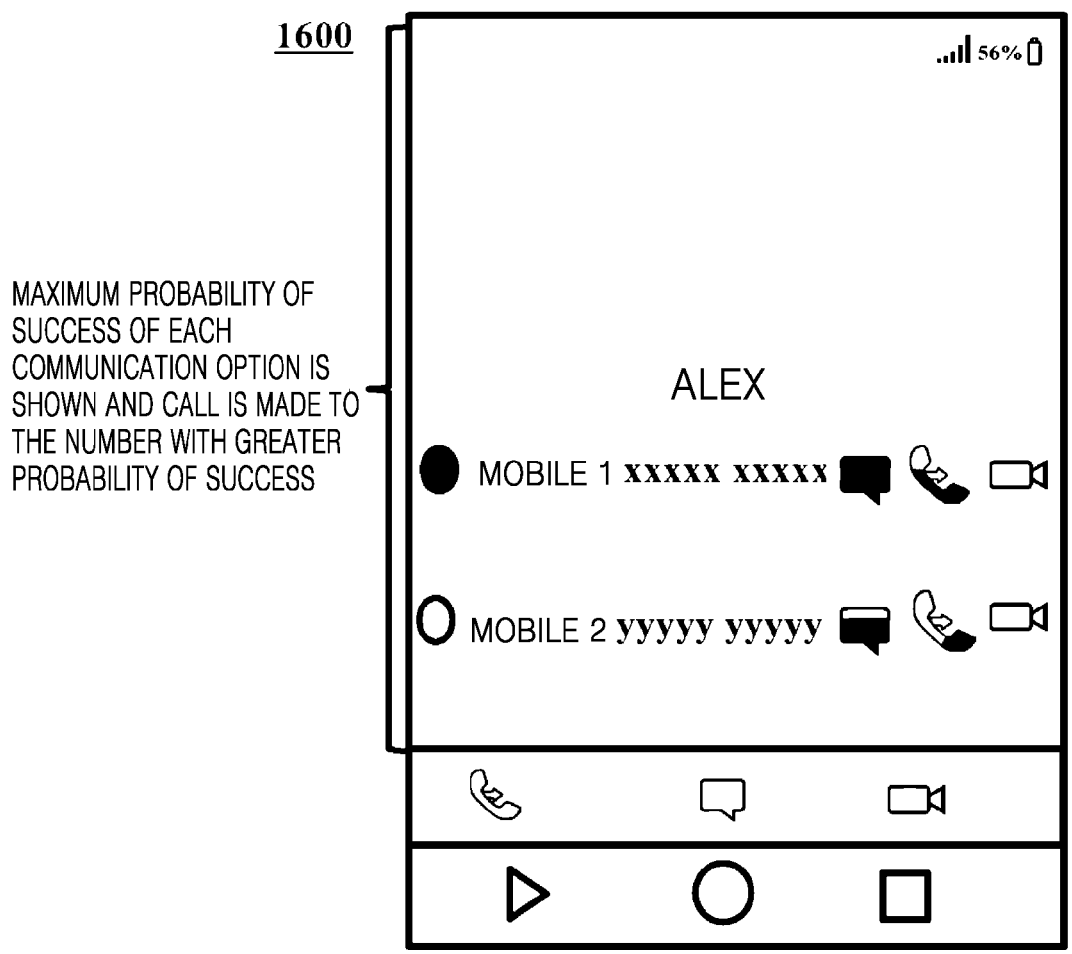

[Fig. 17A]
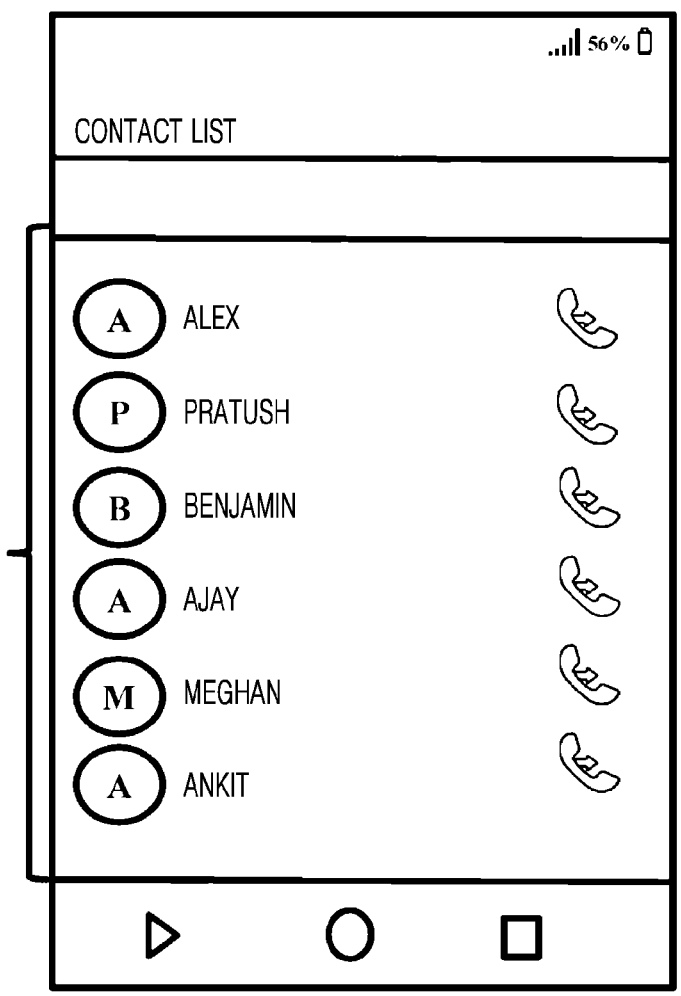
OPTIONS FOR COMMUNICATION IN THIRD PARTY APPLICATIONS DO NOT PROVIDE A PROBABILITY OF SUCCESS

[Fig. 17B]
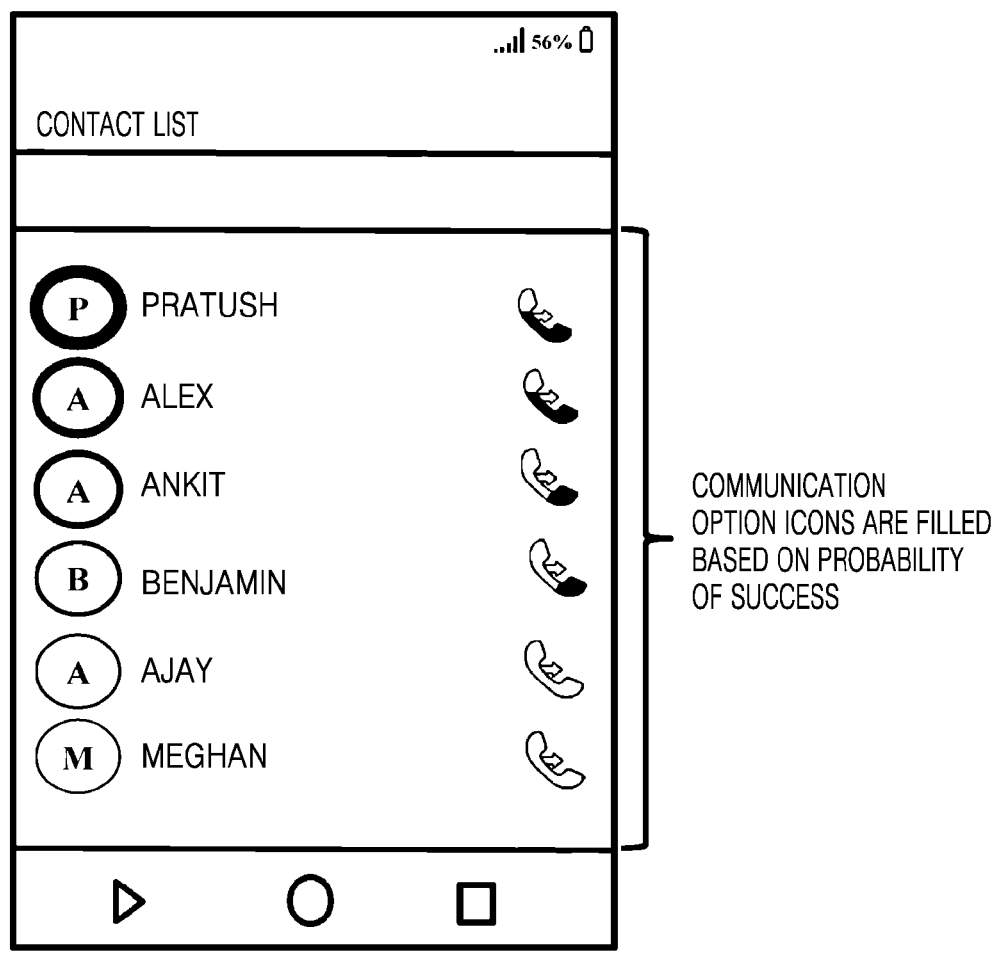

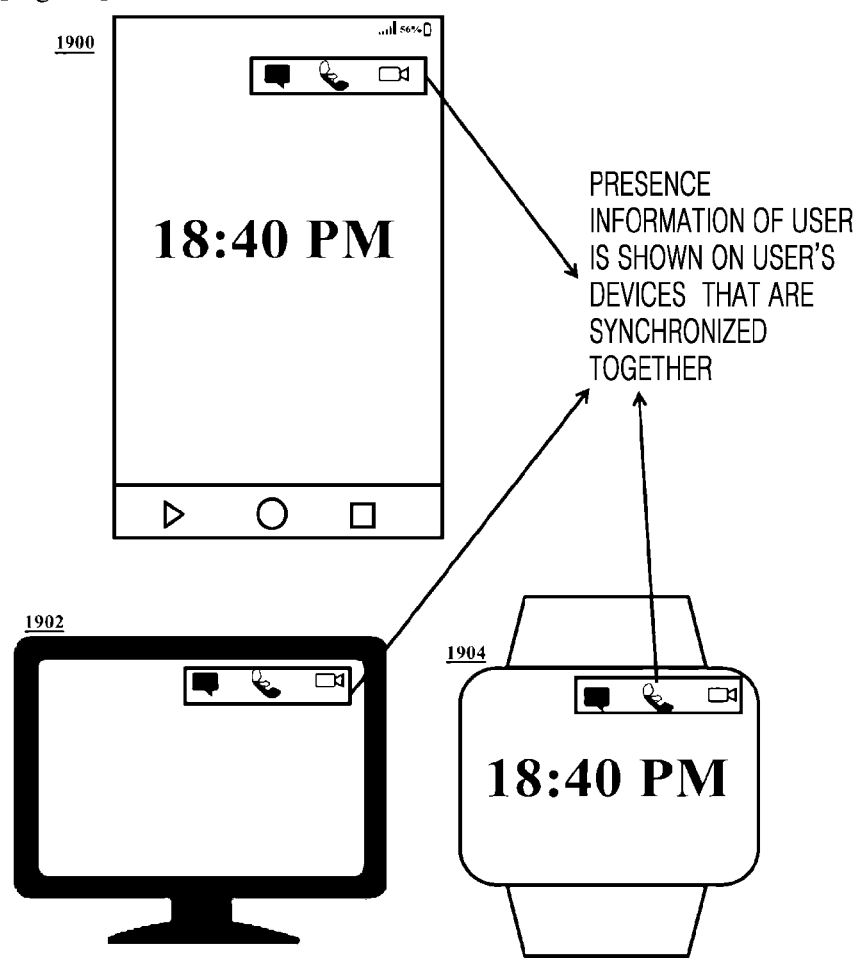
[Fig. 19]

METHOD AND APPARATUS FOR PROVIDING COMMUNICATION AVAILABILITY OF USERS

TECHNICAL FIELD

Embodiments herein relate in general to displaying communication options for a user to communicate with other users, and more particularly relates to displaying presence information.

BACKGROUND ART

Communication devices, particularly mobile or portable electronic devices, have become increasingly prevalent for communication purposes. Many users use mobile electronic devices as their primary means of communication. Mobile electronic devices can perform various functions such as a phonebook function, a cellular phone service function, a Voice over Internet Protocol ("VoIP") phone service function, functions associated with various software applications stored thereon, an email access function, functions associated with internet capabilities, calendar functions, a music playback function, a video playback function, and the like.

Users may use phonebook functionality to select a contact of another user with whom the users wish to communicate. The contact of a user generally includes the user's username, address, phone number, and e-mail address address. Further, the contacts may be sorted or organized. For example, the contacts may be sorted based on usernames, and a user may search the contacts by scrolling through usernames displayed in the contacts.

However, the other user of the selected contact may decline a communication request when communication is unavailable or not desired, for example, when driving or working in an office.

DISCLOSURE

Technical Solution

According to an embodiment, there is provided an electronic device comprising: a memory storing instructions; and at least one processor configured to execute the instructions to: generate state information regarding a device state of the electronic device of a first user and communication information regarding communications of the first user with a second user; transmitting the state information and the communication information to a server or an electronic device of the second user, wherein the state information and the communication information are used to determine communication availability of the first user and to provide the second user with information regarding the communication availability of the first user.

DESCRIPTION OF DRAWINGS

The above and other advantages of the embodiments will be better understood from the following description with reference to the accompanying drawings, in which:

FIG. 1 is a block diagram of a system including electronic devices and a server according to an embodiment;

FIG. 2 is a block diagram illustrating exemplary components of an electronic device according to an embodiment;

FIG. 3 is a block diagram illustrating exemplary components of a server according to an embodiment;

FIG. 4A is a flowchart illustrating a method of determining a preferred communication option for communication between electronic devices according to an embodiment;

FIG. 4B is a flowchart illustrating a method of determining a preferred communication option for communication between electronic devices according to an embodiment;

FIG. 5 is a flowchart illustrating a method of determining presence information according to an embodiment;

FIG. 6 is a flowchart illustrating a method of determining presence information according to an embodiment;

FIG. 7 is a flowchart illustrating a method for determining presence information based on context information according to an embodiment;

FIGS. 8A, 8B, 8C and 8D illustrate device states according to occasions, activities, modes, and locations, respectively;

FIG. 9A illustrates a user interface according to a prior art;

FIG. 9B illustrates an example user interface in which user contacts are sorted based on presence information according to an embodiment;

FIG. 10A illustrates a user interface according to a prior art;

FIG. 10B illustrates a user interface in which probability of success of communication is shown based on presence information according to an embodiment;

FIG. 11A illustrates a user interface according to a prior art;

FIG. 11B illustrates a user interfaces in which statuses of various contacts are displayed based on their presence status according to an embodiment;

FIG. 12A illustrates a user interface according to a prior art;

FIGS. 12B and 12C illustrate user interfaces in which a notification is provided according to an embodiment;

FIG. 13A illustrates a user interface according to a prior art;

FIGS. 13B and 13C illustrate user interfaces in which a notification is provided according to an embodiment;

FIG. 14A illustrates a user interface according to a prior art;

FIG. 14B illustrates a user interface in which a preferred mode of communication for each user is displayed according to an embodiment;

FIG. 15A illustrates a user interface according to a prior art;

FIG. 15B illustrates a user interface in which contacts are sorted as per availability according to an embodiment;

FIG. 16A illustrates a user interface according to a prior art;

FIG. 16B illustrates a user interface in which probability of success of communication is shown for multiple contact entries based on presence information according to an embodiment;

FIG. 17A illustrates a user interface according to a prior art;

FIG. 17B illustrates a user interface in which contacts are sorted in a third party application based on presence information according to an embodiment;

FIG. 19 illustrates user interfaces of different electronic devices according to an embodiment.

BEST MODE

Figure 18:
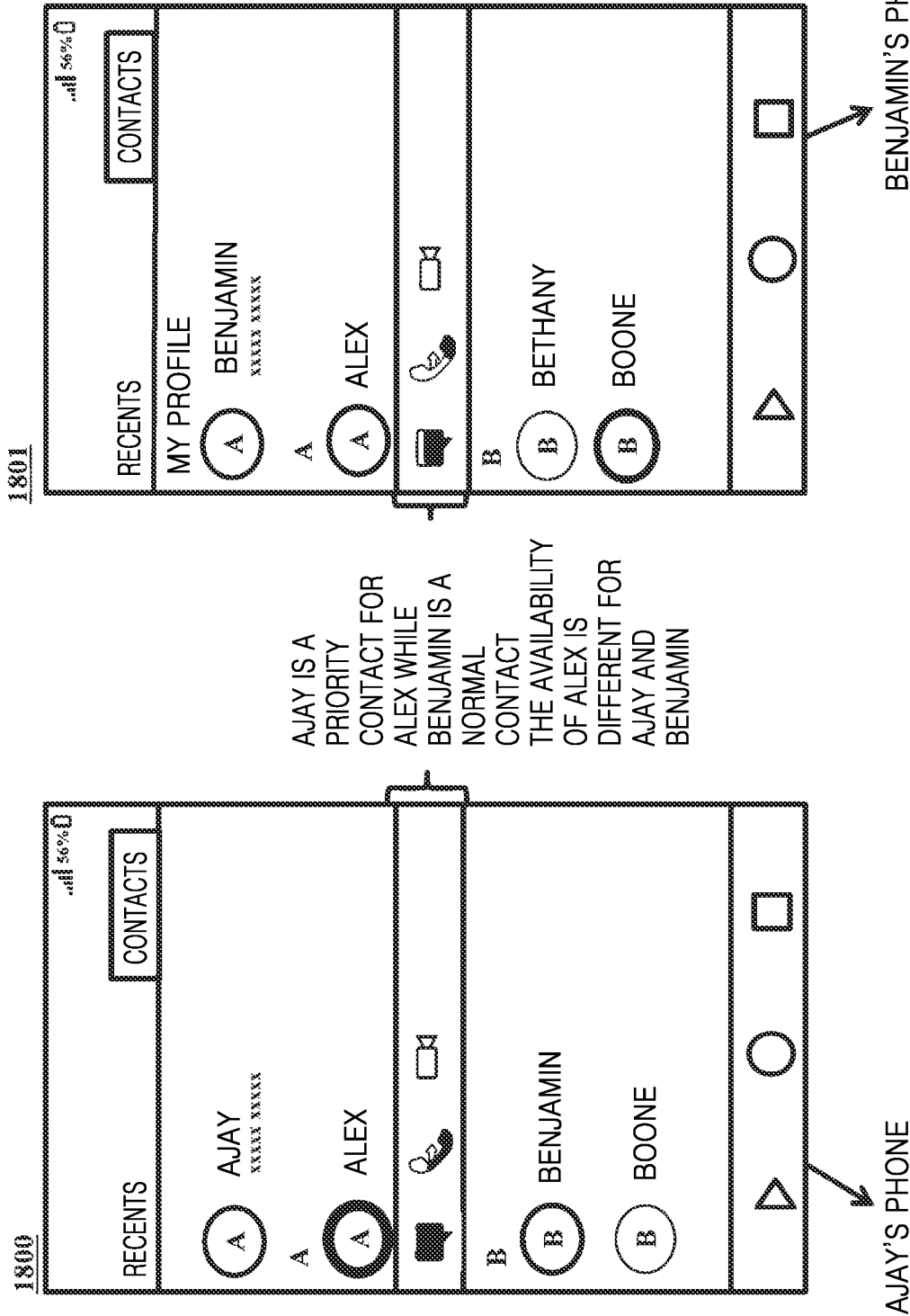
FIG. 18 illustrate user interfaces in which preferred modes of communication are shown based on presence information according to an embodiment.

Aspects of the disclosure are to address at least the above-mentioned problems and/or disadvantages and to provide at least the advantages described below.

According to an embodiment, there is provided an electronic device comprising: a memory storing instructions; and at least one processor configured to execute the instructions to: generate state information regarding a device state of the electronic device of a first user and communication information regarding communications of the first user with a second user; transmitting the state information and the communication information to a server or an electronic device of the second user, wherein the state information and the communication information are used to determine communication availability of the first user and to provide the second user with information regarding the communication availability of the first user.

According to an embodiment, the communication information is generated based on at least one of a number of times communications requested by the second user and accepted by the first user, and a number of times communications requested by the second user and rejected by the first user.

According to an embodiment, the state information and the communication information is generated with respect to a category including a plurality of subcategories.

According to an embodiment, the information regarding the communication availability of the first user comprises information regarding a means of communication available to the first user.

According to an embodiment, the communication availability of the first user is determined at the electronic device of the second user.

According to an embodiment, the communication availability of the first user is determined at the server, and the communication availability of the first user is notified by the server to the electronic device of the second user.

According to an embodiment, the communication availability of the first user is determined based on a plurality of behavioral parameters related to at least one of a device mode, an activity of the first user, a location of the first user, and an occasion.

According to an embodiment, the communication availability of the first user adjusted based on whether the second user is included in a priority contact list of the first user.

According to an embodiment, the communication availability of the first user adjusted based on a communication frequency between the first user and the second user.

According to an embodiment, the at least one processor is further configured to execute the instructions to: obtain information regarding communication availability of the second user which is determined based on state information of the second user and communication information regarding communications of the second user with the first user; and display, based on the information regarding the communication availability of the second user, an interface indicating the communication availability of the second user.

According to an embodiment, the communication availability of the second user is determined based on state information regarding a device state of an electronic device of the first user and communication information regarding communications of the second user with the first user.

According to an embodiment, the information regarding the communication availability of the second user comprises information regarding at least one means of communication available to the second user, and the displayed interface comprises at least one graphic representation indicating the at least one means of communication available to the second user.

According to an embodiment, the at least one graphic representation further indicates success probability of communication with the second user when using the at least one means of communication available to the second user.

According to an embodiment, the success probability is represented as covering at least a part of the graphic representation.

According to an embodiment, there is provided a method comprising: generating state information regarding a device state of the electronic device of a first user and communication information regarding communications of the first user with a second user; transmitting the state information and the communication information to a server or an electronic device of the second user, wherein the state information and the communication information are used to determine communication availability of the first user and to provide the second user with information regarding the communication availability of the first user.

According to an embodiment, there is provided a computer program product comprising a non-transitory computer readable medium comprising instructions which, when executed by a computer, cause the computer to carry out the method.

According to an embodiment, there is provided a method comprising: obtaining state information regarding a device state of an electronic device of a first user and communication information regarding communications of the first user with a second user; determining communication availability of the first user based on the state information of the first user and the communication information regarding communications of the first user with the second user; and providing the second user with information regarding the communication availability of the first user.

According to an embodiment, the communication information is generated based on at least one of a number of times communications requested by the second user and accepted by the first user, and a number of times communications requested by the second user and rejected by the first user.

According to an embodiment, the method further comprises: adjusting the communication availability of the first user based on whether the second user is included in a priority contact list of the first user.

According to an embodiment, the method further comprises: adjusting the communication availability of the first user based on a communication frequency between the first user and the second user.

Accordingly, embodiments herein provide a method determining a presence information of a user contact. The method comprises receiving, by an electronic device, a device state of a first user and a degree of communication of the first user with a second user, wherein a contact identifier of the first user is stored in a contact list of the second user in the electronic device. The method further comprises determining, by the electronic device, presence information of the first contact based on the device state of the first user and the degree of communication of the first user with the second user and storing, by the electronic device, the presence information for the first user in the contact list of the second user.

In an embodiment, the degree of communication comprises information about at least one of a number of times a communication is accepted by the first user from the second user, and a number of times a communication is rejected by the first user from the second user.

In an embodiment, the method further comprises automatically prioritizing, by the electronic device, at least one preferred mode of communication of the first user based on the presence information of the first user and displaying, by the electronic device, the at least one preferred mode of communication of the first user based on the prioritizing in the contact list of the second user.

In an embodiment, the preferred mode of communication is associated with an indication indicating a probable level of communication of the first user with the at least one second user in the device state of the electronic device.

Accordingly, embodiments herein provide a method for determining presence information of a user contact. The method further comprises receiving, by a server, a device state of a first user, determining, by the server, a priority information associated with at least one second user and a degree of communication of the first user with the at least one second user, wherein a contact identifier of the at least one second user is stored in a contact list of the first user, computing, by the server, presence information of the first user for the at least one second user based on the presence information of the first user and the degree of communication of the first with the at least one second and the priority information associated with the at least one second user and sending, by the server, the device state information of the first user to the at least one second user.

In an embodiment, the method further comprises automatically prioritizing, by the server, at least one preferred mode of communication of the first user based on the presence information of the first user and transmitting, by the server, the at least one preferred mode of communication of the first user based on the prioritizing to the at least one second user.

In an embodiment, the priority information for the at least one second user is dynamically determined based on a frequency of communication of the first user with the at least one second user.

Accordingly, embodiments herein provide a method for determining a presence information of a user contact. The method further comprises detecting, by an electronic device, an electronic device context based on a plurality of behavioral parameters, determining, by the electronic device, a device state of a user of the electronic device based on the plurality of behavioral parameters and sending, by the electronic device, the device state of the user to a server to determine the presence information of the user for at least one contact of the user.

In an embodiment, the behavioral parameters comprise information about a device state of the electronic device, an activity of the user, an event, and a location of the user. Each behavioral parameter of the plurality of behavioral parameters indicates at least one of a number of communications accepted by the user from at least one contact stored in a contact list of the user and a number of communications rejected by the user from at least one contact stored in a contact list of the user.

In an embodiment, the device state indicates a state of battery of the electronic device and an operation mode of the electronic device and a context information of the electronic device. In another embodiment, the method further comprises automatically prioritizing, by the electronic device, at least one preferred mode of communication based on the device state and displaying, by the electronic device, the at least one preferred mode of communication based on the prioritizing.

In an embodiment, the at least one preferred mode of communication is displayed on at least one of a lock screen of the electronic device, on a notification panel of the electronic device, a portion of a contact application of the electronic device, a portion of a communication application, and another a secondary device connected with the electronic device. In another embodiment, the preferred mode of communication is associated with an indication indicating a probable level of communication in the device state of the electronic device.

Accordingly, embodiments herein provide an electronic device for determining presence information of a user contact. The electronic device comprises a contact list of a first user comprising a contact identifier of a second user and a presence information controller. The presence information controller is configured to receive a device state of a second user and a degree of communication of the second user with a first user, determine presence information of the second user based on the device state of the second user and the degree of communication of the second user with the first user and store the presence information of the second user in the contact list of the first user.

In an embodiment, the presence information controller is further configured to automatically prioritize at least one preferred mode of communication of the second user based on the presence information of the second user and display the at least one preferred mode of communication of the second user based on the prioritizing in the contact list of the first user.

Accordingly, embodiments herein provide a server for determining presence information of a user contact. The server comprises a memory configured store a contact list of first user comprising at least one contact number of at least one second user and a presence information controller. The presence information controller is configured to receive a device state of the first user, determine a priority information associated with the at least one second user and a degree of communication of the first user with the at least one second user, compute presence information of the first user for the at least one second user based on the presence information of the first user and the degree of communication of the first with the at least one second and the priority information associated with the at least one second user and send the device state information of the first user to the at least one second user.

Accordingly, embodiments herein provide an electronic device for determining presence information of a user contact. The electronic device comprises a contact list comprising a plurality of user contacts and a presence information controller. The presence information controller is configured to detect an electronic device context based on a plurality of behavioral parameters, determine a device state of a user of the electronic device based on the plurality of behavioral parameters and send the device state of the user to a server to determine the presence information of the user for at least one contact of the user.

MODE FOR INVENTION

The following description with reference to the accompanying drawings is provided to assist in a comprehensive understanding of various embodiments of the disclosure as defined by the claims and their equivalents. The following description includes various specific details to assist in that understanding but these are to be regarded as merely exemplary. Accordingly, those of ordinary skill in the art will recognize that various changes and modifications of the various embodiments described herein may be made without departing from the scope and spirit of the disclosure as defined in the appended claims. In addition, descriptions of well-known functions and constructions may be omitted for clarity and conciseness.

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the embodiments. Furthermore, the one or more elements may have been represented in the drawings by various symbols, and the drawings may show only those specific details that are pertinent to understanding the embodiments of the disclosure so as not to obscure the drawings with details that will be readily apparent to those of ordinary skill in the art having benefit of the description herein.

The terms and words used in the following description and claims are not limited to the bibliographical meanings, but, are merely used by the inventors to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. Additionally, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Moreover, various functions described below may be implemented or supported by one or more computer programs, each of which may be formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data may be permanently stored and media where data may be stored and later overwritten, such as a rewritable optical disc or an erasable memory device.

The term "unit", "manager", "engine", or "device" may refer to a unit which processes at least one function or operation and may be implemented by hardware, software, or a combination of hardware and software.

According to an embodiment, contacts may be updated automatically and options to communicate with the contact may be displayed. The options may be arranged in a priority manner According to an embodiment, information indicative of communication availability may be displayed.

Referring now to the drawings, where similar reference characters denote corresponding features consistently throughout the figures, there are shown embodiments.

FIG. 1 is a block diagram of a system including electronic devices and a server according to an embodiment.

As illustrated in FIG. 1, the system 100 may include electronic devices 104A, 104B, 104C, . . . , and 104N, a server 102, and contacts database 106. The electronic device 104A may transmit information regarding a change in a device state of the electronic device 104A to the server 102. The device state of the electronic device 104 may be but not limited to a state of a battery or power source of the electronic device 104, and an operation mode of the electronic device 104. Further, the device state of the electronic device 104A may further pertain to user context information. The user context information may indicate a situation of the electronic device 104A or a user who is using the electronic device 104A. The change in the device state may be detected at the electronic device 104A and the information regarding the change in the device state may be transmitted to the server 102 from the electronic device 104A.

In some embodiments, communication availability of a user may be determined based on behavioral parameters. The behavioral parameters may be related to a device mode, an activity of the user, a location of the user, and an occasion. The activity of the user may be determined by sensors of the electronic device 104A to sense a certain movement of the electronic device 104A. For example, when the electronic device 104A senses a certain amount of vertical or horizontal movement, the activity of the user may be determined as workout. For example, when the electronic device 104A senses insignificant movement, the activity of the user may be determined as sleep. The occasion may be determined by a schedule entered by a user of the electronic device 104A.

How many communication requests from each contact are accepted and how many communication requests from each contact are rejected may be calculated for each behavioral parameter, specifically, for each subcategory of each behavioral parameter. For example, when the user accepts a relatively fewer calls while driving than while not driving, so declined call ratios (or accepted call ratios) during driving mode and non-driving mode may be determined.

A first weighted value Wi may be assigned to each behavioral parameter. W1, W2, W3, and W4 may be assigned to a device mode parameter, an activity parameter, a location parameter, and an occasion parameter, respectively, but are not limited thereto. More or less than 4 behavioral parameters may be used according to an embodiment. The first weighted value Wi may be fixed for each behavioral parameter, for example, W1, W2, W3, and W4 may be 50, 30, 15, and 5, but are not limited thereto. Generally, a device mode is set by a user, so its weight value W1 may be greater than other behavioral parameters W2, W3, and W4.

A second weighted value Wix may be further assigned to each behavioral parameter. The second weighted value Wix may be calculated based on a declined call ratio. For example, when a user has accepted 300 calls out of 1,000 calls during ultra power saving mode (UPSM), the user's second weighted value W13 may be equal to (1000-3000)/1000*100(%)=70%. The user's declined call ratio may be determined based on communication information regarding communications between the user and other users, and may be calculated based on data collected or trained over a certain time period. When the user's first and second weight values W1 and W13 are 50 and 70%, a device mode parameter C1 may be equal to W1><W13/100=35. The device mode parameter C1 may be used to determine a communication availability parameter Ci. The second weighted value Wix may be assigned to each subcategory of each behavioral parameter, and each behavioral parameter may be determined based on a multiply of the first and second weighted values Wi and Wix.

Referring to Table 1, a subcategory of the device mode parameter may include airplane mode, emergency mode, ultra power saving mode (UPSM), driving mode, and Do-Not-Disturb (DND) mode, but is not limited thereto. Referring to Table 1, a subcategory of the activity parameter may include sleep activity, workout activity, and non-workout activity, but is not limited thereto. Referring to Table 1, a subcategory of the location parameter may include home location, office location, and other location, but is not limited thereto. Referring to Table 1, a subcategory of the occasion parameter may include holiday occasion, festival occasion, and personal event occasion, but is not limited thereto.

A device mode parameter C1, an activity parameter C2, a location parameter C3, and an occasion parameter C4 may be determined based on a multiply of first and second weighted values Wx and Wix.

TABLE 1

| Device Mode (W1) | | Activity (W2) | | Location (W3) | | Occasion (W4) | |
|---|---|---|---|---|---|---|---|
| Parameter | % Value | Parameter | % Value | Parameter | % Value | Parameter | % Value |
| Airplane | W11 | Sleep | W21 | Home | W31 | Holiday | W41 |
| Emergency | W12 | Workout | W22 | Office | W32 | Festival | W42 |
| UPSM | W13 | Non-Workout | W23 | Others | W33 | Personal Event | W43 |
| Driving | W14 | | | | | | |
| DND | W15 | | | | | | |
| C1=> | W1XW1x/100 | C2=> | W2XW2x/100 | C3=> | W3XW3x/100 | C4=> | W4XW4x/100 |

A communication availability parameter Ci may be determined as a sum of behavioral parameters C1, C2, C3 and C4. In general, each behavioral parameter Ci may be computed as Equation 1.

$$Ci = \Sigma(Wix \times (\Sigma Wix)/Si)/100 \quad \text{Equation 1}$$

In Equation 1, i denotes an index corresponding to each category, x represents an index of subcategories in a category, Si represents a number of subcategories in ith category, Wi represents a weighted value of ith category and Wix represents a weighted value of xth subcategory in ith category. The communication availability parameter C may be determined as per Equation 2.

$$C = \Sigma Ci \quad \text{Equation 2}$$

The communication availability parameter C may be determined based on a sum of behavioral parameters Ci. Based on the communication availability parameter, communication availability may be determined using Equation 3.

$$LPS = 100 - C \quad \text{Equation 3}$$

In Equation 3, LPS stands for live phonebook status, and indicate communication availability of a user. In some embodiments, the communication availability of the user of the electronic device 104A may be determined based on behavioral parameters and communication information regarding communications between the user of the electronic device 104A and users of electronic devices 104B, 104C to 104N. The communication information may be used to calculate the second weighted value. The users of the electronic devices 104B to 104N may be represented as contact identifiers displayed in a contact list of the user of the electronic device 104A, but are not limited thereto. Likewise, a contact identifier of the user of the electronic device 104A may be displayed in a contact list of the users of the electronic device 104B to 104N, but is not limited thereto. For example, a contact of the user of the electronic device 104A may be displayed in a contact list of a user of the electronic device 104B, and not displayed in a contact list of a user of the electronic device 104N, according to their relationship. Communication information of the user of the electronic device 104A may include information about a number of times a communication is accepted by the user of the electronic device 104A from the users of the electronic devices 104B to 104N, and a number of times a communication is rejected by the user of the electronic device 104A from the users of the electronic devices 104B to 104N.

In some embodiments, preferred modes of communication of each user may be prioritized based on presence information. The preferred mode of communication of each user may be displayed in a contact list. Presence of a user may indicate communication availability of the user, and the presence information may be referred to as information regarding communication availability. Preferred modes of communication of a user may be determined based on information regarding communication availability of the user.

In some embodiments, the server 102 may receive state information regarding a device state of the electronic device 104A from the electronic device 104A and determine priority information of the user of the electronic device 104A associated with users of the electronic devices 104B to 104N. The priority information of the user may be determined based on whether the other users of the electronic device 104B to 104N are included in a priority contact list of the user. The priority contact list of the user may be stored in a contact database 106. Further, communication information regarding communications between the electronic device 104A and each of the electronic devices 104B to 104N may be determined. The presence information of the user of the electronic device 104A for each of the users of the electronic devices 104B to 104N may be computed based on the priority information, the state information, and the communication information of the user.

In an embodiment, presence information of a user, that is, information regarding communication availability of the user, may be determined based on communication information regarding communications between the user and other users. The communication information may be determined based on a declined call ratio of the user. The presence information of the user may be adjusted according to a caller. For example, when the caller is included in a priority contact list of the user, communications between the caller and the user are more frequent as compared to other users, the caller's calls are accepted by the user in a higher ratio as compared to other users, or communication availability of the user to the caller may be greater than other users. The presence information (presence or communication availability) may be referred to as live phonebook status (LPS), and caller-specific presence information (presence or communication availability) may be referred to as live phonebook status final (LPSf).

For example, when a user of the electronic device 104B is in a priority contact list of the user of the electronic device 104A, and a declined call ratio is equal to ten percentage, the presence information of the user of the electronic device 104A, denoted as LPSf (Final Live Phonebook Status), may be computed using Equation 4, which may allow LPSf of the user of the electronic device 104A to vary according to who is making a call to the user of the electronic device 104A. The declined call ratio may be determined based on a history of communication between the users of the electronic device 104A and 104B, specifically, communications initiated by the user of the electronic device 104B.

$$LPSf=LPS-(10\% \text{ of } LPS) \qquad \text{Equation 4}$$

When the user of the electronic device 104B is not in the priority contact list of the user of the electronic device 104A, the declined call ratio may double. Accordingly, the presence information is computed using Equation 5.

$$LPSf=LPS-(2*10\% \text{ of } LPS) \qquad \text{Equation 5}$$

The value LPSf may be pushed to the electronic device 104B. The above method may be implemented for each of the users of the electronic devices 104B to 104N.

In some embodiments, each of the electronic devices 104A to 104N may detect a change in user context information based on behavioral parameters, such as but not limited to information about device modes of the electronic devices 104A to 104B, activities of the users of the electronic devices 104A to 104B, locations of the users, and occasions. The user context information may indicate a situation of an electronic device or a user who is using the electronic device. Each behavioral parameter may be determined based on a number of accepted communications and a number of declined or rejected communications between each of the electronic devices 104A to 104N.

The electronic devices 104A, 104B to 104N (hereinafter collectively referred to as an electronic device 104) may be any electronic device, such as desktop computers, portable computers, smart phones, tablet computers, wearable devices, and the like. The electronic device 104 may also include a display for displaying any data. The display may be, but not limited to, a Cathode Ray Tube (CRT) display, a Liquid Crystal Display (LCD), a Light Emitting Diode (LED) display, and the like. Embodiments are intended to include or otherwise cover any type of display, including known, related art, and/or later developed technologies.

The server 102 may include a non-transitory computer medium that may be configured to receive and transmit communication requests and/or communication responses to and from the electronic device 104. The server 102 may be any or a combination of a server, a local computer connected to the electronic devices 104.

The contacts database 106 may store lists of contacts associated with a user of the electronic device 104. The contacts database 106 may be, but not limited to, a relational database, a navigational database, a cloud database, an in-memory database, a distributed database and the like.

FIG. 2 is a block diagram illustrating exemplary components of an electronic device according to an embodiment.

An electronic device 104 may include a communication controller 210, a presence information controller 220, a device state controller detector 230, a contact list 240, a learning classifier 250 and a memory 260, but is not limited thereto.

The presence information controller 220 may be, but not limited to, a Central Processing Unit (CPU), a microprocessor, or a microcontroller. The presence information controller 220 may be coupled to the device state controller detector 230, the contact list 240, the learning classifier 250 and the memory 260. The presence information controller 220 may determine presence information based on state information detected by the device state detector 230 and communication information. The presence information controller 220 may execute sets of instructions stored on the memory 260. The memory 260 may include storage locations to be addressable through the presence information controller 220. The memory 260 is not limited to a volatile memory and/or a non-volatile memory. Further, the memory 260 may include one or more computer-readable storage media. The memory 260 may include non-volatile storage elements. For example non-volatile storage elements may include magnetic hard discs, optical discs, floppy discs, flash memories, or forms of electrically programmable memories (EPROM) or electrically erasable and programmable (EEPROM) memories. The memory 260 is coupled to the contact list 240. The contact list 240 may store lists of contacts associated with the user of the electronic device 104. The contact list 240 may be but not limited to a relational database, a navigational database, a cloud database, an in-memory database, a distributed database and the like.

The communication controller 210 may be a set of integrated circuits used to receive data from and transmits data to the server 102 and other electronic devices. The device state detector 220 230 may be a set of integrated circuits and semiconductor chips that determines state information associated with the electronic device 104. The device state detector 230 may use values in Table 1 to determine communication availability parameter C. The learning classifier 250 may be a set of machine learning-based chips that models behavior of the user of the electronic device 104. The values of table 1 may be determined through known machine learning techniques, data mining techniques, behavior modeling by obtaining weighted values corresponding to categories and subcategories in Table 1.

In some embodiments, the mobile device may include a display screen coupled to the presence information controller 220.

FIG. 3 is a block diagram illustrating exemplary components of a server according to an embodiment.

The server 102 may include a communication controller 310, a presence information controller 320, a contact prioritizer 330, a learning classifier 340 and a memory 360.

The presence information controller 320 may be, but not limited to, a Central Processing Unit (CPU), a microprocessor, or a microcontroller. The presence information controller 320 may be coupled to the memory 350, the communication controller 310, the presence information controller 320, the contact prioritizer 330 and the learning classifier 340. The presence information controller 320 may execute sets of instructions stored on the memory 350. The memory 350 may include storage locations to be addressable through the processor (e.g., learning classifier 340). The memory 350 is not limited to a volatile memory and/or a non-volatile memory. Further, the memory 350 may include one or more computer-readable storage media. The memory 350 may include non-volatile storage elements. For example non-volatile storage elements may include magnetic hard discs, optical discs, floppy discs, flash memories, or forms of electrically programmable memories (EPROM) or electrically erasable and programmable (EEPROM) memories. In some examples the memory 350 may be coupled to the contacts database 106 (shown in FIG. 1). In some embodiments, the memory 350 may include the contacts database 106.

The communication controller 310 may be a set of integrated circuits used to receive data from and transmits data to the electronic device 104. The presence information controller 320 may determine presence information of the electronic device 104 based on the state information received from the electronic device, communication information regarding communications between the electronic device 104 and other electronic devices and the priority information of the electronic device 104 which is associated with the other electronic device. The contact prioritizer 330 may be a set of chips that determines whether a contact identifier associated with each of the users of the other electronic devices is included in a list of priority contact identifiers stored on the memory 350 or the contacts database 106. The learning classifier 340 may be a set of machine learning-based chips that models behavior of the user of the electronic device 104. In some embodiments, based on the of communication, the learning classifier 340 may analyze if any of the users of the other electronic devices (hereinafter "a second user") is a priority contact of the user of the electronic device 104 (hereinafter "a first user").

FIG. 4A is a flowchart illustrating a method of determining a preferred communication option for communication between electronic devices according to an embodiment.

When a first user of an electronic device 104A stores a user profile 402 in his contact list 240 with contacts of other users (e.g., contacts 404A, 404B to 404N). The contacts 404A, 404B to 404N may correspond to users operating the electronic devices 104B, 104C to 104N. The device state detector 230 of the electronic device 104A may detect a change in context information pertaining to the first user or the electronic device 104A. The context information may be updated in the server 102. Further, based on the change in context information, a communication availability parameter C of the first user may be determined using values from Table 1. The communication availability parameter C may be used to determine communication availability of the first user. The communication availability may be represented as an LPS value. Information regarding the communication availability of the first user, that is, presence information of the first user may be transmitted to the server 102 and the presence information controller 320 may determine caller-specific presence information of the first user corresponding to each of the contacts 404A, 404B to 404N using the Equations 4 and 5. The caller-specific presence information may be transmitted to a corresponding electronic device.

FIG. 4B is a flowchart illustrating a method of determining a preferred communication option for communication between electronic devices according to an embodiment.

When a first user of an electronic device 104A stores a user profile 402 in his contact list 240 with contacts of other users (e.g., contacts 404A, 404B to 404N). The contacts 404A, 404B to 404N may correspond to users operating the electronic devices 104B, 104C to 104N. The device state detector 230 of the electronic device 104A may detect a change in context information pertaining to the first user or the electronic device 104A. The context information may be updated in the server 102. Further, based on the change in context information, a communication availability parameter C of the first user may be determined using values from Table 1. The communication availability parameter C may be used to determine communication availability of the first user. The communication availability may be represented as an LPS value. Information regarding the communication availability of the first user, that is, presence information of the first user may be transmitted to each of the electronic devices 104B to 104N via the server 102. The presence information controllers 220B, 220C, to 220N of the electronic devices 104B, 104C to 104N may determine caller-specific presence information of the first user respectively corresponding to the contacts 404A, 404B to 404N, respectively, using the Equations 4 and 5.

FIG. 5 is a flowchart illustrating a method of determining presence information according to an embodiment.

At step 502, an electronic device of a second user may receive state information regarding a device state of an electronic device of a first user and communication information regarding communications of the first user with the second user. In an embodiment, the first user may be included in a contact list of the second user.

At step 504, presence information of the first user may be determined based on the state information, and the communication information.

At step 506, the presence information of the first user may be stored in a memory of the electronic device of the second user.

At step 508, based on the presence information of the first user, preferred modes of communication such as text, phone call or video call available to the first user may be automatically prioritized. For example, based on the presence information, the most preferred mode of communication of the first user may be texting or short message services.

At step 510, the preferred modes of communication of the first user may be displayed in the contact list of the second user.

FIG. 6 is a flowchart illustrating a method of determining presence information according to an embodiment.

At step 602, a device state of an electronic device of a first user may be received at a server. In some embodiments, the device state detector 230 of the electronic device 104 (shown in FIG. 2) may detect a change in a device state of the electronic device of the first user and notify the presence information controller 220 (shown in FIG. 2). The device state detector 230 (shown in FIG. 2) may use the weighted values of Table 1 to determine communication availability of the first user. For example, when the first user is in an office, a weighted value W32 in Table 1 corresponding to a subcategory "Office" in a category "Location" may be utilized to determine communication availability of the first user.

At step 604, the contact prioritizer 330 of the server 104 102 (shown in FIG. 3) may provide priority information indicative of whether the second user is included in a priority contact list of the first user.

At step 608, when the second user is included in the priority contact list of the first user, caller-specific communication availability of the first user for the second user may be determined based on the communication availability and a declined call ratio of the first user. The declined call ratio of the first user may be determined based on a number of calls to the first user requested by the second user and declined by the first user, and a number of total calls to the first user requested by the second user.

At step 606, when the second user is not included in the priority contact list of the first user, caller-specific communication availability of the first user may be determined based on the communication availability and a double of the declined call ratio.

At step 610, information regarding the caller-specific communication availability of the first user may be transmitted by the server to the second user's electronic device.

At step 612, based on the information regarding communication availability of the first user or caller-specific communication availability of the first user, modes of communication such as text, phone call or video call from the second user to the first user may automatically prioritized. For example, based on the information regarding communication availability of the first user, the most preferred mode of communication of the first user may be texting or short message services.

At step 614, accordingly, the modes of communication may be displayed in the contact list of the second user based on the information regarding the communication availability of the first user.

FIG. 7 is a flowchart illustrating a method for determining presence information based on an electronic device context according to an embodiment.

At step 702, the device state detector 230 of the electronic device 104 (shown in FIG. 2) may detect a change in a device state of an electronic device of the first user and notify the presence information controller 220 (shown in FIG. 2).

At step 704, the device state detector 230 (shown in FIG. 2) may use the weighted values of Table 1 to determine communication availability of the first user. For example, when the first user is in an office. a office, a weighted value W32 in Table 1 corresponding to a subcategory "Office" in a category "Location" may be utilized to determine the communication availability of the first user. Each category shown in Table 1 may correspond to a behavioral parameter.

At step 706, information regarding the communication availability of the first user may be transmitted to a server to further determine caller-specific communication availability of the first user corresponding to the second user.

FIGS. 8A, 8B, 8C and 8D illustrate device states according to an occasion, activities, modes, and locations, respectively.

FIGS. 8A, 8B, 8C, and 8D illustrate device states according to the categories which is explained above. In an embodiment, the device state may be determined based on two variables. One of the two variable may correspond to a situation of a user or his electronic device, and either one may correspond to how many calls are accepted during a certain situation. The device states may be one of "sleep", "idle", "active" and "in call." The device state represented in FIGS. 8A, 8B, 8C, and 8D may be results of data accumulated over a certain time period, for example, 7 days. Data for device states may be accumulated by the learning classifier 250.

FIG. 8A illustrates average device state in days on which a user has a personal event which falls in a subcategory of the category "Occasion." For example, when the user has a personal event, the user's electronic device may be in between "sleep" and "idle" device states at the beginning and the end of the day on average, and activity may peak between 9 and 16 o'clock on average. The value W43 (shown in Table 1) may be calculated based on data shown in FIG. 8A.

FIG. 8B illustrates average device state according to user's activities, for example, including sleeping, workout, and non-workout. For example, the user's electronic device may be in between "sleep" and "idle" device states at the beginning and the end of the day while the user sleeps, and activity may peak between 17 and 20 o'clock during a workout. The value W21 (shown in Table 1), for the device state during the time the user sleeps, may be calculated based on data shown in FIG. 8B.

FIGS. 8C and 8D illustrate average device state according to Device Modes and Locations respectively. The values W11 to W15 (shown in Table 1) and the values W31 to W34 (shown in Table 1) may be calculated based on data shown in FIGS. 8C and 8D respectively. Data shown in FIGS. 8A, 8B, 8C, and 8D may be or may be not relevant to each other.

FIG. 9A illustrates a user interface according to a prior art. According to the prior art, contacts are shown as being saved.

FIG. 9B illustrates an example user interface in which user contacts are sorted based on presence information according to an embodiment. In an embodiment, the user contacts may be sorted based on presence information in a user interface 900 as illustrated in FIG. 9B. The presence information may be referred to as information regarding communication availability.

Based on presence information contact identifiers may be sorted by the presence information controller 220. As shown in FIG. 9B, the contact identifiers may be sorted based on an LPSf value determined for each user in the contacts. Each contact identifier may correspond to the first user described as transmitting its state information and communication information in the flowcharts 400, 500 and 600. For example, Presence information corresponding to the contact identifier "Pratush" may be transmitted a user of the user interface 900 via the server 102, and then communication availability of "Pratush" may be compared with other users. As shown in FIG. 9B, as communication availability increases, a contact identifier may be highlighted with a thicker outline, and a contact identifier having the most communication availability may rank at first in the user interface 900. For example, communication availability of "Pratush" is greater than "Alex" and so forth.

FIG. 10A illustrates a user interface according to a prior art. According to the prior art, when a contact identifier is selected, communication options, such as phone call, messaging, and video call, are merely displayed.

FIG. 10B illustrates a user interface in which probability of success of communication is shown based on presence information according to an embodiment. The presence information may be referred to as information regarding communication availability. According to an embodiment, success probability of communication may be displayed in the user interface 1000 based on presence information regarding communication availability of a user 1002. The learning classifier 250 may predict success probability of each means of communication based on the presence information. The success probability may be represented as covering at least a part of a graphic representation indicating a means of communication. Referring to FIG. 10B, success probability of phone call may be higher than video call. Based on the presence information, the presence information controller 320 (shown in FIG. 3) or the presence information controller 220 automatically prioritizes a preferred mode of communication. For example, a preferred mode of communication of a user may be referred to as a means of communication available to the user. As shown in FIG. 10B, messaging, phone call, and video call are arranged in an order of being preferred by a user "Benjamin" Referring to FIG. 10B, a video calling option may have the least probability of success.

Further, the success probability may be represented as covering at least a part of a graphic representation indicating a preferred mode of communication. For example, the preferred mode of communication may be associated with associated with probable level of communication success. As shown in FIG. 10B, an icon representing a preferred option may be filled with a color or highlighted in a specific color indicative of success probability of the preferred option.

FIG. 11A illustrates a user interface according to a prior art. According to the prior art, a contact list including usernames is merely displayed.

FIG. 11B illustrates a user interfaces in which statuses of various contacts are displayed based on their presence status according to an embodiment. The presence status may be displayed based on presence information, and the presence information may be referred to as information regarding communication availability.

Referring to FIG. 11B, various contacts of a user "Ajay" may be displayed in a user interface 1100 based on presence status of users' contact identifiers 1102, 1104, 1106 and 1108. A user's presence status may be determined based on a device state of the user's electronic device. State information regarding a device state of the user's electronic device may be transmitted to the server 102, and then utilized by the presence information controller 320 to determine presence information (LPSf). Presence information (LPSf) and state information of other users may be transmitted to an electronic device of the user "Ajay", and accordingly displayed as shown in FIG. 11B. For example, based on presence information and state information of users "Alex", "Aman", "Benjamin", and "Boone", their presence status may be displayed as "Battery Low", "Available", "Driving", and "Airplane Mode". If there is a change in a device state, the presence information may be redetermined and accordingly presence status may change.

FIG. 12A illustrates a user interface according to a prior art. According to the prior art, no follow-up action is not performed when a communication fails.

FIGS. 12B and 12C illustrate user interfaces in which a notification is provided according to an embodiment. Referring to FIG. 12B, a pop-up message 1202 and a notification 1204 may be provided in a user interface 1200 in the event of a failed communication.

Referring to FIG. 12B, a pop-up message 1201 indicating availability of a callee "Alex". For example, when a preferred mode of communication of the callee "Alex" is messaging, if a caller attempts to make a video call to the callee "Alex", a pop-up message 1202 may be displayed in the user interface 1200 of the caller. Accordingly, when the device state of the callee "Alex" changes, a notification 1204 indicative that the callee "Alex" becomes available may be provided in the user interface 1200 of the caller.

FIG. 13A illustrates a user interface according to a prior art. According to the prior art, when a contact identifier is selected, communication options, such as phone call, messaging, and video call, are merely displayed, and time available to a callee is not provided. For example, when a user attempts to communicate with a user "Benjamin" through a video call, and the user "Benjamin" is unavailable for video calls, the user is not provided with any notification regarding communication availability of the user "Benjamin".

FIGS. 13B and 13C illustrate user interfaces in which a notification is provided according to an embodiment.

Referring to FIGS. 13B and 13C, a notification may be provided on a user interface 1300 of a communication requester based on presence information of the user "Benjamin" When attempting to video call to the user "Benjamin," and such a communication is not preferred by or available to "Benjamin", a message indicative when video call option will be available may be provided on the user interface 1300. When video call option will be available may be determined by the learning classifier 250 estimating a change in device state of the user "Benjamin" and its time. In some embodiments, time available for communication may be provided manually by the user "Benjamin."

FIG. 14A illustrates a user interface according to a prior art. According to the prior art, a contact list is merely displayed with usernames in a wearable device (a smart watch). The wearable device may display contacts that is synchronized with an electronic device.

FIG. 14B illustrates a user interface in which a preferred mode of communication for each user is displayed according to an embodiment.

Referring to FIG. 14B, the most preferred mode of communication of each user in a contact list may be displayed on a user interface 1400. The user interface 1400 may be displayed on a wearable device as illustrated in FIG. 14B, but is not limited thereto.

FIG. 15A illustrates a user interface according to a prior art. According to the prior art, a search result may be provided in an alphabetical order according to a search keyword.

FIG. 15B illustrates a user interface in which contacts are sorted as per availability according to an embodiment.

Referring to FIG. 15B, a search result may be sorted in a user interface 1500 by the presence information controller 220 based on presence information regarding communication availability.

FIG. 16A illustrates a user interface according to a prior art. According to the prior art, when a contact stores multiple contact entries and the contact is selected, the first contact entry is used to make a communication unless otherwise manually selected.

FIG. 16B illustrates a user interface in which probability of success of communication is shown for multiple contact entries based on presence information according to an embodiment. Referring to FIG. 16B, when a user contact with multiple contact entries is selected, an entry having a relatively higher probability of success may be determined based on presence information of contact entry. For example, as shown in FIG. 16B, when a contact entry "Mobile 1" has a higher probability of communication success than another entry "Mobile 2", the contact entry "Mobile 1" may be highlighted to attract a caller's attention. "The contact entry "Mobile 1" may be selected when an icon of making a phone call to the user "Alex" is selected.

FIG. 17A illustrates a user interface according to a prior art. According to the prior art, when a third party application, such as social networking application, a banking application, a video provider application, uses contacts stored in an electronic device, the contacts are merely displayed in the third part application.

FIG. 17B illustrates a user interface in which contacts are sorted in a third party application based on presence information according to an embodiment. Referring to FIG. 17B, when a third party application requests user contacts from an electronic device, presence information may be used to sort the user contacts according to communication availability and to provide indicators representing a probability of communication success in the third party application. Based on presence information, the presence information controller 320 (shown in FIG. 3) or the presence information controller 220 may automatically prioritizes a preferred mode of communication. The preferred mode of communication may be displayed on a user interface 1700 as shown in FIG. 17B.

In some embodiments, the preferred mode of communication may be displayed through the third party application. For example, in a third party application such as a banking application or social networking application may use presence information obtained from the server 102 to initiate communication with another user through a preferred mode of the other user. Presence information of any user may be received as well as users in contacts.

In an example, a video sharing application may import the user contacts, and based on presence information (LPSf), the video sharing application may display the preferred mode of communication of other users. Further, the preferred mode of communication may be associated with associated with probable level of communication success, and an icon representing a preferred option may be filled with a color or highlighted in a specific color indicative of success probability of the preferred option. For example, an option to share the video through the video sharing application may be associated with the probable level of communication success, and an icon representing a preferred option to share the video may be filled with a color or highlighted in a specific color indicative of success probability of the preferred option. The user contacts may be sorted according to the success probability of the preferred option as illustrated in FIG. 17B, and the user interface 1700 may be filtered by a phone call option.

FIG. 18 illustrate user interfaces in which preferred modes of communication are shown based on presence information according to an embodiment.

FIG. 18 illustrates a user interface 1800 in which preferred modes of communication of a user "Alex" are shown for a user "Ajay," and a user interface 1801 in which preferred modes of communication of the same user "Alex" are shown for another user "Benjamin" In an embodiment, communication availability of the user "Alex" may vary according to communication requesters. For example, when a priority contact list of the user "Alex" includes the user "Ajay" but not includes the user "Benjamin", the communication availability of the user "Alex" may be determined as being higher for "Ajay" than "Benjamin".

FIG. 19 illustrates user interfaces of different electronic devices according to an embodiment.

FIG. 19 illustrates a monitor user interface 1902, a smart watch user interface 1904 and a smartphone user interface 1904 1900. The different three electronic devices may be synchronized with each other such that a contact list may be shared between three devices. Either one or all of the three devices may correspond to the electronic device explained above. Accordingly, based on device state and presence information, communication options of an owner may be displayed on each of the devices of the owner. The various actions, acts, blocks, steps, or the like in the flowchart may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein may be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the embodiments as described herein.

The invention claimed is:

1. An electronic device comprising:
a memory storing instructions; and
at least one processor configured to execute the instructions to:
generate state information regarding a device state of the electronic device of a first user and communication information regarding communications of the first user with a second user;
transmit the state information and the communication information to a server or an electronic device of the second user, the state information and the communication information being used to determine communication availability of the first user and to provide the second user with information regarding the communication availability of the first user, and
display at least one graphic representation indicating at least one communication option available to the second user,
wherein the at least one graphic representation further indicates, via a non-textual indication, success probability of communication with the second user when using the at least one communication option available to the second user.

2. The electronic device of claim 1, wherein the communication information is generated based on at least one of a number of times communications are requested by the second user and accepted by the first user, or a number of times communications are requested by the second user and rejected by the first user.

3. The electronic device of claim 1, wherein the state information and the communication information is generated with respect to a category including a plurality of subcategories.

4. The electronic device of claim 1, wherein the information regarding the communication availability of the first user comprises information regarding the at least one communication option available to the first user.

5. The electronic device of claim 1, wherein the communication availability of the first user is determined at the electronic device of the second user.

6. The electronic device of claim 1, wherein the communication availability of the first user is determined at the server, and the communication availability of the first user is transmitted by the server to the electronic device of the second user.

7. The electronic device of claim 1, wherein the communication availability of the first user is determined based on a plurality of behavioral parameters related to at least one of a device mode, an activity of the first user, a location of the first user, or an occasion.

8. The electronic device of claim 1, wherein the communication availability of the first user is adjusted based on whether the second user is included in a priority contact list of the first user.

9. The electronic device of claim 1, wherein the communication availability of the first user is adjusted based on a frequency communications between the first user and the second user.

10. The electronic device of claim 1, wherein the at least one processor is further configured to execute the instructions to:
obtain information regarding communication availability of the second user which is determined based on state information of the second user and communication information regarding communications of the second user with the first user; and
display, based on the information regarding the communication availability of the second user, an interface indicating the communication availability of the second user.

11. The electronic device of claim 10, wherein the communication availability of the second user is determined based on state information regarding a device state of an electronic device of the first user and communication information regarding communications of the second user with the first user.

12. The electronic device of claim 10,
wherein the information regarding the communication availability of the second user comprises information regarding the at least one communication option available to the second user.

13. The electronic device of claim 10, wherein the success probability is represented as covering at least a part of the at least one graphic representation.

14. An electronic device comprising:
a memory storing instructions; and
at least one processor configured to execute the instructions to:
receive state information regarding a device state of another electronic device of a first user and communication information regarding communications of the first user with a second user of the electronic device, from the other electronic device of the first user,
determine communication availability of the first user based on the state information and the communication information,
display an interface indicating the communication availability of the first user in a contact list of the second user, and
display at least one graphic representation indicating at least one communication option available to the second user,
wherein the at least one graphic representation further indicates, via a non-textual indication, success probability of communication with the second user when using the at least one communication option available to the second user.

15. A method comprising:
obtaining state information regarding a device state of an electronic device of a first user and communication information regarding communications of the first user with a second user;
determining communication availability of the first user based on the state information of the first user and the communication information regarding communications of the first user with the second user;
providing the second user with information regarding the communication availability of the first user; and
displaying at least one graphic representation indicating at least one communication option available to the second user,
wherein the at least one graphic representation further indicates, via a non-textual indication, success probability of communication with the second user when using the at least one communication option available to the second user.

16. The method of claim 15, wherein the communication information is generated based on at least one of a number of times communications are requested by the second user and accepted by the first user, or a number of times communications are requested by the second user and rejected by the first user.

17. The method of claim 15, further comprising:
adjusting the communication availability of the first user based on whether the second user is included in a priority contact list of the first user.

18. The method of claim 15, further comprising:
adjusting the communication availability of the first user based on a frequency of communications between the first user and the second user.

* * * * *